United States Patent
Odani et al.

(10) Patent No.: US 8,367,251 B2
(45) Date of Patent: Feb. 5, 2013

(54) ANODE WITH LITHIUM CONTAINING IONIC POLYMER COAT, METHOD OF MANUFACTURING SAME, SECONDARY BATTERY, AND METHOD OF MANUFACTURING SAME

(75) Inventors: Toru Odani, Fukushima (JP); Hiroyuki Yamaguchi, Fukushima (JP); Masayuki Ihara, Fukushima (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 1078 days.

(21) Appl. No.: 12/182,477

(22) Filed: Jul. 30, 2008

(65) Prior Publication Data

US 2009/0061325 A1    Mar. 5, 2009

(30) Foreign Application Priority Data

Aug. 30, 2007   (JP) ................ P2007-224048
Feb. 14, 2008   (JP) ................ P2008-033262

(51) Int. Cl.
*H01M 2/16* (2006.01)
*H01M 4/02* (2006.01)
*H01M 4/13* (2010.01)
*H01M 4/58* (2010.01)

(52) U.S. Cl. .............. 429/251; 429/209; 429/218.1; 429/246; 429/249

(58) Field of Classification Search .............. 429/330, 429/209, 218.1, 246, 249, 251
See application file for complete search history.

(56) References Cited

U.S. PATENT DOCUMENTS

| | | | |
|---|---|---|---|
| 5,094,774 A | 3/1992 | Imhof et al. | |
| 5,387,366 A | 2/1995 | von Benda et al. | |
| 2002/0114993 A1* | 8/2002 | Miyaki et al. | 429/137 |
| 2004/0241548 A1* | 12/2004 | Nakamoto et al. | 429/231.95 |
| 2005/0003277 A1 | 1/2005 | Lee et al. | |
| 2005/0084760 A1* | 4/2005 | Hwang et al. | 429/234 |
| 2005/0095503 A1* | 5/2005 | Adachi et al. | 429/188 |
| 2007/0072078 A1 | 3/2007 | Hirose et al. | |
| 2007/0122701 A1* | 5/2007 | Yamaguchi | 429/218.1 |
| 2007/0122702 A1* | 5/2007 | Sung et al. | 429/218.1 |
| 2008/0187838 A1* | 8/2008 | Le | 429/231.95 |
| 2010/0075226 A1* | 3/2010 | Pham et al. | 429/219 |

FOREIGN PATENT DOCUMENTS

| | | |
|---|---|---|
| JP | 2-24966 | 1/1990 |
| JP | 6-349489 | 12/1994 |
| JP | 2000-21448 | 1/2000 |
| JP | 2005-26230 | 1/2005 |
| JP | 2005-166469 | 6/2005 |
| JP | 2006-196339 | 7/2006 |
| JP | 2006-210208 | 8/2006 |
| JP | 2007-95563 | 4/2007 |

* cited by examiner

*Primary Examiner* — Basia Ridley
*Assistant Examiner* — Sean P Cullen
(74) *Attorney, Agent, or Firm* — Oblon, Spivak, McClelland, Maier & Neustadt, L.L.P.

(57) ABSTRACT

A secondary battery capable of improving the cycle characteristics is provided. The secondary battery includes a cathode, an anode, and an electrolytic solution. The anode has an anode current collector, an anode active material layer that is provided on the anode current collector, and contains an anode active material containing at least one of a simple substance of silicon, an alloy of silicon, a compound of silicon, a simple substance of tin, an alloy of tin, and a compound of tin, and a coat that is provided on the anode active material layer, and contains an ionic polymer containing lithium.

41 Claims, 10 Drawing Sheets

ANODE WITH LITHIUM CONTAINING IONIC POLYMER COAT, METHOD OF MANUFACTURING SAME, SECONDARY BATTERY, AND METHOD OF MANUFACTURING SAME

CROSS REFERENCES TO RELATED APPLICATIONS

The present invention contains subject matter related to Japanese Patent Application JP 2007-224048 filed in the Japanese Patent Office on Aug. 30, 2007 and Japanese Patent Application JP 2008-033262 filed in the Japanese Patent Office on Feb. 14, 2008, the entire contents of which being incorporated herein by references.

BACKGROUND OF THE INVENTION

1. Field of the Invention

The present invention relates to an anode in which a coat is provided on an active material layer, a method of manufacturing the same, a secondary battery including the anode, and a method of manufacturing the same.

2. Description of the Related Art

In recent years, portable electronic devices such as combination cameras (videotape recorder), digital still cameras, mobile phones, Personal Digital Assistants, and notebook personal computers have been widely used, and it is strongly demanded to reduce their size and weight and to achieve their long life. Accordingly, as a power source for the portable electronic devices, a battery, in particular a light-weight secondary batter capable of providing a high energy density has been developed.

Specially, a secondary battery using insertion and extraction of lithium for charge and discharge reaction (so-called lithium ion secondary battery) is extremely prospective, since such a secondary battery provides a higher energy density than that of a lead battery and a nickel cadmium battery. As an active material of the anode (anode active material) of the lithium ion secondary battery, a carbon material has been widely used.

In recent years, as high performance of the portable electronic devices is developed, further improvement of the battery capacity is demanded. Thus, it has been considered to use tin, silicon or the like instead of the carbon material as an anode active material (for example, refer to U.S. Pat. No. 4,950,566). Since the theoretical capacity of tin (994 mAh/g) and the theoretical capacity of silicon (4199 mAh/g) are significantly higher than the theoretical capacity of graphite (372 mAh/g), it is prospected that the battery capacity is thereby highly improved.

However, in the lithium ion secondary battery with a high capacity, there has been the following disadvantage. The anode active material inserting lithium in charge becomes highly activated, and thus the electrolytic solution is easily decomposed and lithium is easily inactivated. As a result, when charge and discharge are repeated, the charge and discharge efficiency is lowered and thus it is not able to obtain sufficient cycle characteristics.

Accordingly, to improve the battery characteristics such as the cycle characteristics, an electrolytic solution containing a fluoro complex salt such as an alkali metal salt of hexafluoroantimonate, an alkali metal salt of hexafluorotantalate, lithium hexafluoroniobate, lithium hexafluorovanadate, lithium tetrafluoroferrate, lithium pentafluorotitanate, and lithium pentafluorozirconate; or a halogeno complex salt such as alkali metal periodate is used (for example, refer to Japanese Unexamined Patent Application Publication Nos. 58-204478, 63-310568, 03-152879, 06-290808, 2002-047255, and 2003-142154).

Further, to improve the cycle characteristics, forming an inert coat on the surface of the anode active material using a lithium compound such as lithium fluoride and lithium carbonate or an oxide such as silicon oxide and an aluminum oxide has been considered (for example, refer to Japanese Unexamined Patent Application Publication Nos. 2004-327211, 07-302617, 10-255800, 11-135153, 2005-026230, 2005-142156, 2005-166469, and 2006-185728).

SUMMARY OF THE INVENTION

In the recent portable electronic devices, the high performance and the multi functions thereof tend to be increasingly developed. Accordingly, there is a tendency that charge and discharge of the secondary battery are frequently repeated, and thus the electrolytic solution is decomposed and the discharge capacity is easily lowered. Such a disadvantage that the electrolytic solution is decomposed due to charge and discharge is easily generated in the case, in particular, where tin, silicon or the like having a large theoretical capacity is used as an anode active material. Thus, further improvement of the cycle characteristics of the secondary battery has been aspired.

In view of the foregoing, in the invention, it is desirable to provide an anode capable of improving the cycle characteristics, a method of manufacturing the anode, a secondary battery including the anode, and a method of manufacturing the battery.

According to an embodiment of the invention, there is provided an anode including an anode current collector, an anode active material layer that is provided on the anode current collector and contains an anode active material containing at least one of a simple substance of silicon, an alloy of silicon, a compound of silicon, a simple substance of tin, an alloy of tin, and a compound of tin, and a coat that is provided on the anode active material layer and contains an ionic polymer containing lithium. According to an embodiment of the invention, there is provided a secondary battery including the foregoing anode, a cathode, and an electrolytic solution.

According to an embodiment of the invention, there is provided a method of manufacturing an anode, in which after an anode active material layer is formed on an anode current collector, a coat is formed on the anode active material layer by using a solution containing an ionic polymer containing lithium. According to an embodiment of the invention, there is provided a method of manufacturing a secondary battery including a cathode, an anode, and an electrolytic solution, in which the anode is manufactured as described above.

According to the anode and the method of manufacturing the anode of the embodiment of the invention, the coat containing the ionic polymer containing lithium is formed on the anode active material layer. Thus, compared to a case not forming the coat, the chemical stability of the anode is improved. Therefore, in the case where the anode is used together with the electrolytic solution for a electrochemical device such as a secondary battery, the decomposition reaction of the electrolytic solution is inhibited. Thereby, according to the secondary battery using the anode of the embodiment of the invention and the method of manufacturing the secondary battery, the cycle characteristics are improved. In this case, the coat is formed by using the solution containing the ionic polymer containing lithium. Thus, compared to a case using a method necessitating special environmental conditions such as reduced pressure environment, the favorable coat may be easily formed.

Other and further objects, features and advantages of the invention will appear more fully from the following description.

DETAILED DESCRIPTION OF THE PREFERRED EMBODIMENT

An embodiment of the invention will be hereinafter described in detail with reference to the drawings.

Figure 1:
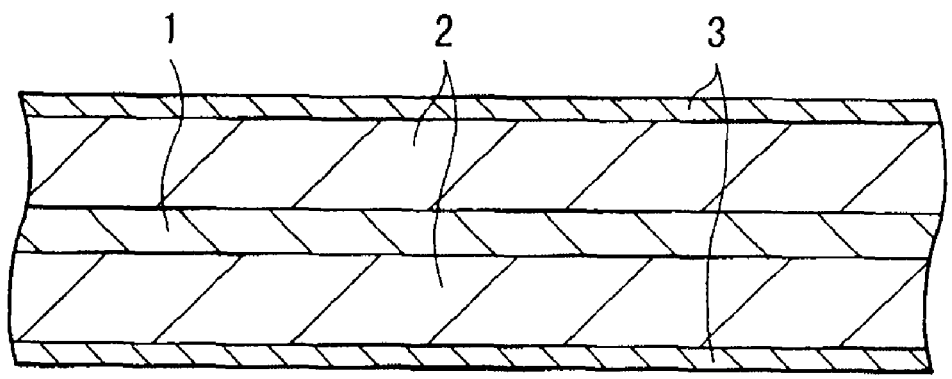
FIG. 1 is a cross section view showing a structure of an anode according to an embodiment of the invention.

FIG. 1 shows a cross sectional structure of an anode according to an embodiment of the invention. The anode is used, for example, for an electrochemical device such as a secondary battery. The anode has an anode current collector 1, an anode active material layer 2 provided on the anode current collector 1, and a coat 3 provided on the anode active material layer 2.

The anode current collector 1 is preferably made of a material having favorable electrochemical stability, favorable electric conductivity, and favorable mechanical strength. As the material, for example, a metal material such as copper (Cu), nickel (Ni), and stainless is cited. Specially, copper is preferable since a high electric conductivity is thereby obtained.

The anode active material layer 2 contains one or more anode materials capable of inserting and extracting an electrode reactant as an anode active material, and may also contain an electrical conductor, a binder or the like according to needs. The anode active material layer 2 may be provided on the both faces of the anode current collector 1, or may be provided on a single face of the anode current collector 1.

As the anode material capable of inserting and extracting the electrode reactant, for example, a material that is capable of inserting and extracting the electrode reactant and contains at least one of metal elements and metalloid elements as an element is cited. Such an anode material is preferably used, since a high energy density is thereby obtained. Such an anode material may be a simple substance, an alloy, or a compound of a metal element or a metalloid element, or may have one or more phases thereof at least in part. In the invention, "the alloy" includes an alloy containing one or more metal elements and one or more metalloid elements, in addition to an alloy composed of two or more metal elements. Further, "the alloy" in the invention may contain a nonmetallic element. The texture thereof includes a solid solution, a eutectic crystal (eutectic mixture), an intermetallic compound, and a texture in which two or more thereof coexist.

As such a metal element or such a metalloid element composing the anode material, for example, a metal element or a metalloid element capable of forming an alloy with the electrode reactant is cited. Specifically, magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt) and the like are cited. Specially, at least one of silicon and tin is preferable. Silicon and tin have the high ability to insert and extract the electrode reactant, and thus provide a high energy density.

As an anode material containing at least one of silicon and tin, for example, a material having at least in part the simple substance, an alloy, or a compound of silicon; the simple substance, an alloy, or a compound of tin; or one or more phases thereof is cited. Each thereof may be used singly, or a plurality thereof may be used by mixture.

As the anode material containing the simple substance of silicon, for example, a material containing the simple substance of silicon as a main body is cited. The anode active material layer 2 containing such an anode material has, for example, a structure in which oxygen (O) and the second element other than silicon exist between silicon simple substance layers. The total content of silicon and oxygen in the anode active material layer 2 is preferably 50 wt % or more, and in particular, the content of the silicon simple substance is preferably 50 wt % or more. As the second element other than silicon, for example, titanium (Ti), chromium (Cr), manganese (Mn), iron, cobalt (Co), nickel, copper, zinc, indium, silver, magnesium (Mg), aluminum, germanium, tin, bismuth, antimony (Sb) and the like are cited. The anode active material layer 2 that contains the material containing the simple substance of silicon as a main body may be formed by co-evaporating silicon and other element.

As the alloy of silicon, for example, a material containing at least one selected from the group consisting of tin, nickel, copper, iron, cobalt, manganese, zinc, indium, silver, titanium, germanium, bismuth, antimony, and chromium as the second element other than silicon is cited. As the compound of silicon, for example, a material containing oxygen or carbon (C) is cited, and may contain the foregoing second element in addition to silicon. Examples of the alloy or the compound of silicon include, for example, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq 2$), $LiSiO$ and the like.

As the alloy of tin, for example, a material containing at least one selected from the group consisting of silicon, nickel, copper, iron, cobalt, manganese, zinc, indium, silver, titanium, germanium, bismuth, antimony, and chromium as the second element other than tin is cited. As the compound of tin, for example, a compound containing oxygen or carbon is cited. The compound may contain the foregoing second element in addition to tin. Examples of the alloy or the compound of tin include $SnO_w$ ($0<w\leq 2$), $SnSiO_3$, $LiSnO$, $Mg_2Sn$ and the like.

In particular, as the anode material containing at least one of silicon and tin, for example, a material containing the second element and the third element in addition to tin as the first element is preferable. When the second element and the third element are contained, the cycle characteristics are improved. The second element is at least one selected from the group consisting of cobalt, iron, magnesium, titanium, vanadium (V), chromium, manganese, nickel, copper, zinc, gallium, zirconium, niobium (Nb), molybdenum (Mo), silver, indium, cerium (Ce), hafnium, tantalum (Ta), tungsten (W), bismuth, and silicon. The third element is at least one selected from the group consisting of boron, carbon, aluminum, and phosphorus (P).

Specially, a SnCoC-containing material that has tin, cobalt, and carbon as an element in which the carbon content is in the range from 9.9 wt % to 29.7 wt % and the cobalt ratio to the total of tin and cobalt (Co/(Sn+Co)) is in the range from 30 wt % to 70 wt % is preferable. In such a composition range, a high energy density is obtained.

The SnCoC-containing material may further contain other element according to needs. As other element, for example, silicon, iron, nickel, chromium, indium, niobium, germanium, titanium, molybdenum, aluminum, phosphorus, gallium, bismuth or the like is preferable. Two or more thereof may be contained, since thereby higher effects are obtained.

The SnCoC-containing material has a phase containing tin, cobalt, and carbon. Such a phase preferably has a low crystallinity structure or an amorphous structure. Further, in the SnCoC-containing material, at least part of carbon as an element is preferably bonded to a metal element or a metalloid element as other element. Cohesion or crystallization of tin or the like is thereby inhibited.

The SnCoC-containing material may be formed by, for example, mixing raw materials of each element, dissolving the resultant mixture in an electric furnace, a high frequency induction furnace, an arc melting furnace or the like and then solidifying the resultant. Otherwise, the SnCoC-containing material may be formed by various atomization methods such as gas atomizing and water atomizing; various roll methods; or a method using mechanochemical reaction such as mechanical alloying method and mechanical milling method. Specially, the SnCoC-containing material is preferably formed by the method using mechanochemical reaction, since thereby the anode active material will have a low crystalline structure or an amorphous structure. In the method using the mechanochemical reaction, for example, a manufacturing apparatus such as a planetary ball mill apparatus and an attliter may be used.

As a measurement method for examining bonding state of elements, for example, X-ray Photoelectron Spectroscopy (XPS) is cited. In XPS, in the case of graphite, the peak of 1s orbit of carbon (C1s) is observed at 284.5 eV in the apparatus in which energy calibration is made so that the peak of 4f orbit of gold atom (Au4f) is observed at 84.0 eV. In the case of surface contamination carbon, the peak is observed at 284.8 eV. Meanwhile, in the case of higher electric charge density of carbon element, for example, when carbon is bonded to a metal element or a metalloid element, the peak of C1s is observed in the region lower than 284.5 eV. That is, when the peak of the composite wave of C1s obtained for the SnCoC-containing material is observed in the region lower than 284.5 eV, at least part of carbon contained in the SnCoC-containing material is bonded to the metal element or the metalloid element as other element.

In XPS, for example, the peak of C1s is used for correcting the energy axis of spectrums. Since surface contamination carbon generally exists on the surface, the peak of C1s of the surface contamination carbon is set to in 284.8 eV, which is used as an energy reference. In XPS, the waveform of the peak of C1s is obtained as a form including the peak of the surface contamination carbon and the peak of carbon in the SnCoC-containing material. Therefore, for example, by performing analysis by using commercially available software, the peak of the surface contamination carbon and the peak of carbon in the SnCoC-containing material are separated. In the analysis of the waveform, the position of the main peak existing on the lowest bound energy side is set to the energy reference (284.8 eV).

In addition to the SnCoC-containing material, a SnCoFeC-containing material having tin, cobalt, iron, and carbon as an element is also preferable. The composition of the SnCoFeC-containing material may be voluntarily set. For example, as a composition in which the iron content is set small, it is preferable that the carbon content is in the range from 9.9 wt % to 29.7 wt %, the iron content is in the range from 0.3 wt % to 5.9 wt %, and the cobalt ratio to the total of tin and cobalt (Co/(Sn+Co)) is in the range from 30 wt % to 70 wt %. Further, for example, as a composition in which the iron content is set large, it is preferable that the carbon content is in the range from 11.9 wt % to 29.7 wt %, the total of cobalt and iron to the total of tin, cobalt, and iron ((Co+Fe)/(Sn+Co+Fe)) is in the range from 26.4 wt % to 48.5 wt %, and the cobalt ratio to the total of cobalt and iron (Co/(Co+Fe)) is in the range from 9.9 wt % to 79.5 wt %. In such a composition range, a high energy density is obtained. The crystallinity, the measurement method for examining bonding state of elements, the forming method of the SnCoFeC-containing material are similar to those of the foregoing SnCoC-containing material.

The anode active material layer 2 using the material having at least in part the simple substance, an alloy, or a compound of silicon; the simple substance, an alloy, or a compound of tin; or one or more phases thereof is formed by using, for example, vapor-phase deposition method, liquid-phase deposition method, spraying method, firing method, or a combination of two or more of these methods. In this case, the anode active material layer 2 and the anode current collector 1 are preferably alloyed in at least part of the interface thereof. Specifically, at the interface thereof, the element of the anode current collector 1 may be diffused in the anode active material layer 2; or the element of the anode active material layer 2 may be diffused in the anode current collector 1; or these elements may be diffused in each other. Thereby, destruction due to expansion and shrinkage of the anode active material layer 2 associated with charge and discharge is inhibited, and the electron conductivity between the anode active material layer 2 and the anode current collector 1 is improved.

As vapor-phase deposition method, for example, physical deposition method or chemical deposition method is cited. Specifically, vacuum evaporation method, sputtering method, ion plating method, laser ablation method, thermal Chemical Vapor Deposition (CVD) method, plasma CVD method and the like are cited. As liquid-phase deposition method, a known technique such as electrolytic plating and electroless plating may be used. Firing method is, for example, a method in which a particulate anode active material mixed with a binder or the like is dispersed in a solvent and the anode current collector is coated with the resultant, and then heat treatment is provided at a temperature higher than the melting point of the binder or the like. For firing method, a known technique such as atmosphere firing method, reactive firing method, and hot press firing method is available as well.

In addition to the foregoing anode material, as the anode material capable of inserting and extracting the electrode reactant, for example, a carbon material is cited. As the carbon material, for example, graphitizable carbon, non-graphitizable carbon in which the spacing of (002) plane is 0.37 nm or more, graphite in which the spacing of (002) plane is 0.34 nm or less and the like are cited. More specifically, pyrolytic carbons, coke, glassy carbon fiber, an organic polymer compound fired body, activated carbon, carbon black or the like is cited. Of the foregoing, the coke includes pitch coke, needle coke, petroleum coke and the like. The organic polymer compound fired body is obtained by firing and carbonizing a phenol resin, a furan resin or the like at an appropriate temperature. In the carbon material, a change in the crystal structure due to insertion and extraction of the electrode reactant is very small. Therefore, for example, by using the carbon material together with other anode material, a high energy density is obtained and superior cycle characteristics are obtained in the case where the anode is used for an electrochemical device such as a secondary battery. In addition, the carbon material also functions as an electrical conductor, and thus the carbon material is preferably used. The shape of the carbon material may be any of a fibrous shape, a spherical shape, a granular shape, and a scale-like shape.

Further, as other anode material capable of inserting and extracting the electrode reactant, for example, a metal oxide, a polymer compound and the like capable of inserting and extracting the electrode reactant are cited. It is needless to say that these anode materials may be used together with the anode material described above. As the metal oxide, for example, iron oxide, ruthenium oxide, molybdenum oxide or the like is cited. As the polymer compound, for example, polyacetylene, polyaniline, polypyrrole or the like is cited.

As the electrical conductor, for example, a carbon material such as graphite, carbon black, acetylene black, and Ketjen black is cited. Such a carbon material may be used singly, or a plurality thereof may be used by mixture. The electrical conductor may be a metal material, a conductive polymer or the like as long as the material has the electric conductivity.

As the binder, for example, a synthetic rubber such as styrene-butadiene rubber, fluorinated rubber, and ethylene propylene diene; or a polymer material such as polyvinylidene fluoride is cited. One thereof may be used singly, or a plurality thereof may be used by mixture.

The coat 3 may cover the entire surface of the anode active material layer 2 or may cover part thereof. Otherwise, the coat 3 may be formed to be permeated into the anode active material layer 2. The coat 3 contains one or more of ionic polymers containing lithium (polymer lithium salt).

As the ionic polymer containing lithium, for example, a polymer obtained by polymerizing a lithium salt having a carboxylate ion group (hereinafter simply referred to as a carboxylate), a lithium salt having a sulfonate ion group (hereinafter simply referred to as a sulfonate), or a lithium salt having a phosphonate group (hereinafter simply referred to as a phosphonate), that is, a homopolymer composed of a monomer of a lithium salt such as lithium acrylate, lithium methacrylate, dilithium maleate, dilithium fumarate, lithium 4-vinylbenzoate, lithium vinylsulfonate, lithium styrenesulfonate, dilithium vinylphosphonate, dilithium arylphosphonate, dilithium styrenephosphonate, monolithium vinylphosphonate, monolithium arylphosphonate, and monolithium styrenephosphonate; or a compound containing a copolymer of the foregoing polymers is cited. The copolymer may contain, as a comonomer, a compound having an unsaturated bond such as ethylene, propylene, 1-butene, styrene, ester acrylate, ester methacrylate, acrylonitrile, vinyl acetate, vinyl pivalate, vinyl ether, maleic anhydride, ester maleate, ester fumarate, N-vinylpyrrolidone, viylidenefluoride, and tetrafluoroethylene.

As a specific example of the ionic polymer containing lithium, lithium polyacrylate having the structure shown in Chemical formula 1(1), lithium polymethacrylate having the structure shown in Chemical formula 1(2), dilithium polymaleate (or dilithium polyfumarate) having the structure shown in Chemical formula 1(3), poly(ethylene-dilithium maleate) copolymer having the structure shown in Chemical formula 1(4), poly(styrene-dilithium maleate) copolymer having the structure shown in Chemical formula 1(5), poly(methylvinyl ether-dilithium maleate) copolymer having the structure shown in Chemical formula 1(6), poly(ethylene-lithium methacrylate) copolymer having the structure shown in Chemical formula 1(7), lithium polyvinylsulfonate having the structure shown in Chemical formula 1(8), lithium polystyrenesulfonate having the structure shown in Chemical formula 1(9), poly(lithium styrenesulfonate-dilithium maleate copolymer having the structure shown in Chemical formula 1(10), dilithium polyvinylphosphonate having the structure shown in Chemical formula 1(11), poly(lithium acrylate-dilithium vinylphosphonate-lithium methacrylate) copolymer shown in Chemical formula 1(12) and the like are cited.

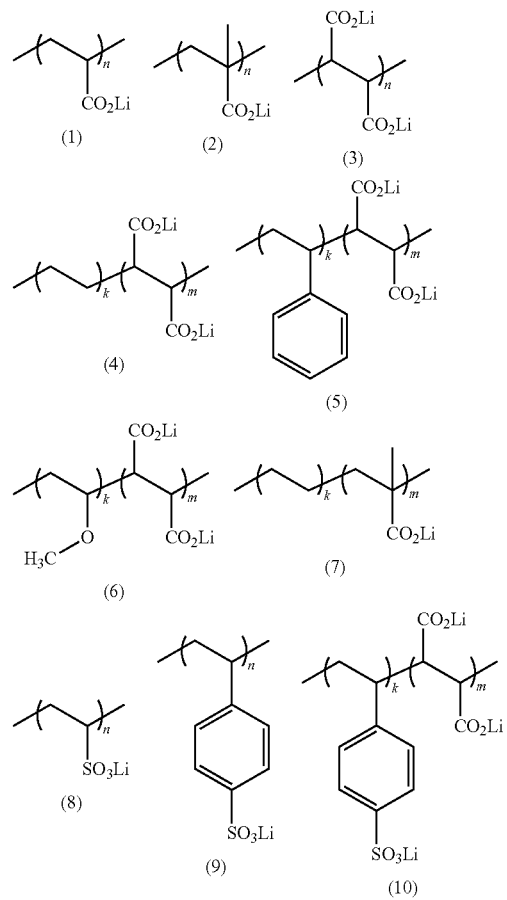

Chemical formula 1

-continued

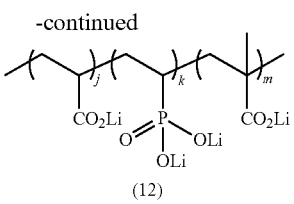

(11) (12)

where j, k, m and n respectively represent an integer number of 2 or larger.

The foregoing coat 3 contributes to improve the chemical stability of the anode. Therefore, in the case where the anode is used together with an electrolytic solution for an electrochemical device such as a secondary battery, the electrode reactant is effectively permeated and decomposition of the electrolytic solution is inhibited, and thus the cycle characteristics are improved. In particular, in the case where the ionic polymer composing the coat 3 contains a carbonate polymer or a phosphonate polymer, higher effects are obtained than a case where the ionic polymer composing the coat 3 contains a sulfonate polymer. Further, in the case where the ionic polymer composing the coat 3 contains a copolymer of a carbonate and a sulfonate or a mixture of a carbonate polymer and a sulfonate polymer, higher effects are obtained. Further, in the case where the electrode reactant is a lithium ion, the permeability is particularly improved and thus higher cycle characteristics are easily obtained. The coat 3 may contain the foregoing ionic polymer containing lithium and a decomposed matter thereof.

As a method of forming the coat 3, for example, liquid-phase deposition method such as coating method, soaking method, and dip coating method; and vapor-phase deposition method such as evaporation method, sputtering method, and Chemical Vapor Deposition (CVD) method are cited. One of these methods may be used singly, or a plurality thereof may be used together. Specially, the coat 3 is preferably formed on the anode active material layer 2 by liquid-phase deposition method using a solution containing the ionic polymer containing lithium. Specifically, for example, in soaking method, the anode current collector 1 on which the anode active material layer 2 is formed is soaked into the solution containing the foregoing compound to form the coat 3. In coating method, the anode active material layer 2 is coated with the foregoing solution to form the coat 3. Thereby the favorable coat 3 having high chemical stability is easily formed. As a solvent into which the ionic polymer containing lithium is dissolved, for example, a solvent having high polarity such as water is cited.

The anode is manufactured, for example, by the following procedure.

First, the anode active material layer 2 is formed on the both faces of the anode current collector 1. When the anode active material layer 2 is formed, for example, anode active material powder, an electrical conductor, and a binder are mixed to obtain an anode mixture. The anode mixture is dispersed in a solvent to obtain paste anode mixture slurry. Subsequently, the anode current collector 1 is coated with the anode mixture slurry, which is dried. After that, the resultant is compression-molded. Subsequently, the coat 3 is formed on the surface of the anode active material layer 2. When the coat 3 is formed, for example, as a solution containing the ionic polymer containing lithium, aqueous solution having a concentration from 1 wt % to 5 wt % is prepared. The anode current collector 1 provided with the anode active material layer 2 is soaked into the foregoing aqueous solution for several seconds, and then taken out and dried at room temperature. Otherwise, the foregoing aqueous solution is prepared, the surface of the anode active material layer 2 is coated with the aqueous solution, and then the resultant is dried. Thereby, the anode is formed.

According to the anode and the method of manufacturing the anode, the coat 3 containing the ionic polymer containing lithium is formed on the anode active material layer 2. Thus, compared to a case where the coat 3 is not formed, the chemical stability of the anode is improved. Therefore, when the anode is used together with an electrolytic solution for an electrochemical device such as a secondary battery, the decomposition reaction of the electrolytic solution is inhibited, and thus the cycle characteristics are improved. In this case, easy treatment such as soaking treatment and coating treatment using the solution containing the ionic polymer containing lithium is used. Thus, compared to a case using a method necessitating special environmental conditions such as reduced pressure environment, the favorable coat 3 is easily formed.

First Modification

Figure 2:
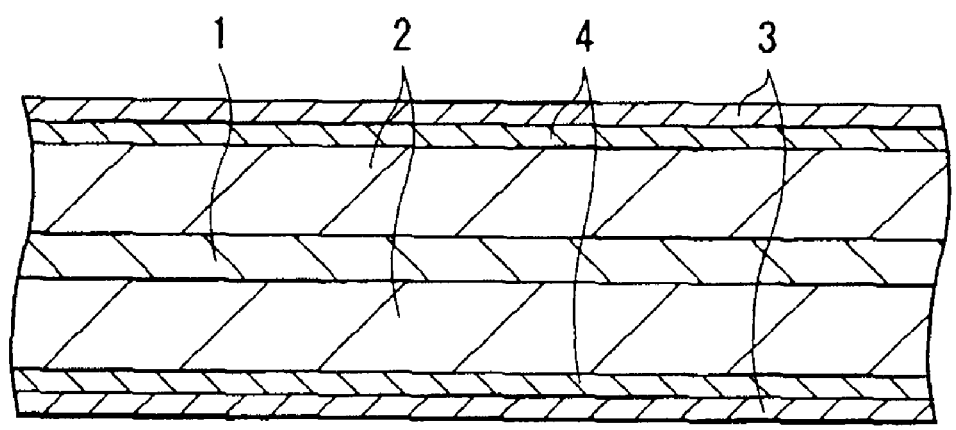
FIG. 2 is a cross section view showing a first modification of the structure of the anode according to the embodiment of the invention.

FIG. 2 represents a first modification of the structure of the anode, and shows a cross sectional structure corresponding to FIG. 1. The anode has a structure similar to that of the anode shown in FIG. 1, except that an oxide coat 4 is provided between the anode active material layer 2 and the coat 3.

The oxide coat 4 may cover the entire surface of the anode active material layer 2 or may cover part thereof. Otherwise, the oxide coat 4 may be formed to be permeated into the anode active material layer 2. The oxide coat 4 contains an oxide of a metal or a metalloid. As the oxide of a metal or a metalloid, an oxide of at least one selected from the group consisting of silicon, germanium, and tin is preferable, since thereby the chemical stability of the anode is improved. As the oxide, in addition to the foregoing oxide, an oxide of aluminum, zinc and the like are cited. As a method of forming the oxide coat 4, for example, a liquid-phase method such as liquid-phase precipitation method, solgel method, polysilazane method, electrocrystallization method, and dip coating method; or vapor-phase deposition method such as evaporation method, sputtering method, and CVD method is cited. Specially, liquid-phase precipitation method is preferable, since thereby the oxide coat 4 is formed while the oxide is easily controlled.

The anode is formed, for example, by the following procedure. First, for example, the anode active material layer 2 is formed on the both faces of the anode current collector 1 by a procedure similar to that of the foregoing method of manufacturing the anode. Subsequently, a mixed solution is prepared by adding and mixing a dissolved species that easily coordinate a fluorine as an anion capture agent into a solution of a fluoride complex of a metal or a metalloid. Subsequently, the anode current collector 1 on which the anode active material layer 2 is formed is soaked into the mixed solution, an fluorine anion generated from the fluoride complex is captured by the dissolved species, and thereby the oxide is precipitated on the surface of the anode active material layer 2. After that, the resultant is washed with water and then dried. Thereby, the oxide coat 4 is formed. Finally, the coat 3 is formed on the surface of the oxide coat 4 by a procedure similar to that of the method of manufacturing the anode described above. Thereby, the anode is formed.

According to the anode of the first modification, the oxide coat 4 is formed between the anode active material layer 2 and the coat 3. Thus, compared to a case where the oxide coat 4 is not formed, the chemical stability of the anode is further improved. Therefore, when the anode as the first modification is used for an electrochemical device such as a secondary battery, the cycle characteristics are improved.

Second Modification

Figure 3:
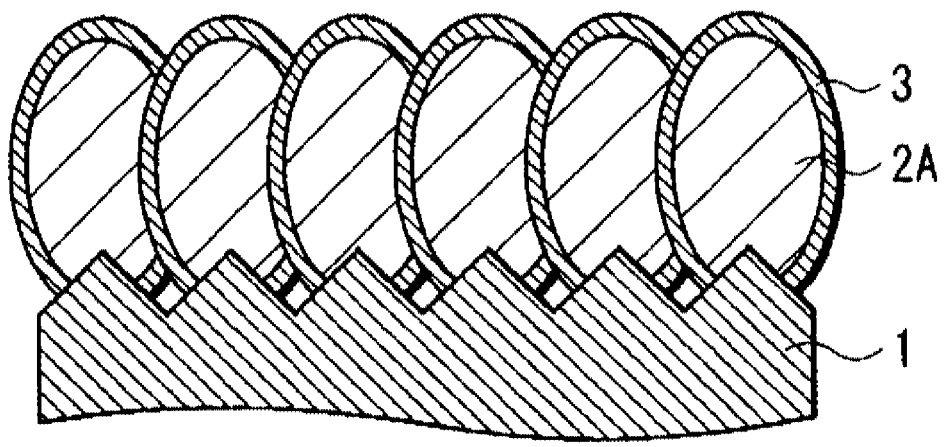
FIG. 3 is a cross section view showing a second modification of the structure of the anode according to the embodiment of the invention.

As shown in FIG. 3, the anode active material layer 2 may be an aggregate of a plurality of anode active material particles 2A composed of the foregoing anode active material. FIG. 3 is a cross section view of enlarging part of the anode and schematically showing the structure thereof On the surface of each anode active material particle 2A, the foregoing coat 3 is provided. The coat 3 desirably covers a wide range of the surface of each anode active material particle 2A as much as possible. In particular, as shown in FIG. 3, the coat 3 desirably covers the entire surface of the anode active material particle 2A.

The anode active material particle 2A is formed by, for example, any of vapor-phase deposition method, liquid-phase deposition method, spraying method, and firing method, or a combination of two or more of these methods. In particular, vapor-phase deposition method is preferably used, since thereby the anode current collector 1 and the anode active material particle 2A are easily alloyed at the interface thereof. Alloying may be made by diffusing the element of the anode current collector 1 into the anode active material particle 2A, or vice versa. Otherwise, alloying may be made by diffusing the element of the anode current collector 1 and silicon as the element of the anode active material particle 2A into each other. Due to such alloying, structural destruction of the anode active material particle 2A resulting from expansion and shrinkage in charge and discharge is inhibited, and the conductivity between the anode current collector 1 and the anode active material particle 2A is improved.

As vapor-phase deposition method, for example, physical deposition method or chemical deposition method may be used. Specifically, vacuum evaporation method, sputtering method, ion plating method, laser ablation method, thermal Chemical Vapor Deposition (CVD) method, plasma CVD method, spraying method and the like are cited. As liquid-phase deposition method, a known technique such as electrolytic plating and electroless plating is used. Firing method is, for example, a method in which a particulate anode active material mixed with a binder or the like is dispersed in a solvent and the anode current collector is coated with the resultant, and then heat treatment is provided at a temperature higher than the melting point of the binder or the like. For firing method, a known technique such as atmosphere firing method, reactive firing method, and hot press firing method is available as well.

The anode active material particle 2A may have a multi-layer structure in which a plurality of layers are layered. In this case, the coat 3 is desirably provided in at least part of respective interfaces between the plurality of layers. When the anode active material particle 2A is formed into the multilayer structure, the film forming step is able to be divided into several stages. Thus, for example, evaporation method or the like generating high heat in forming the film is used, time for exposing the anode current collector 1 at the high heat is able to be reduced more than a case where the anode active material particle 2A with a single layer structure is formed by one time film forming step, and thus damage to the anode current collector 1 is decreased.

In the anode active material layer 2, a metal is preferably formed in a gap between adjacent anode active material particles 2A. The metal has a metal element not being alloyed with the electrode reactant. As the metal element, at least one of iron (Fe), cobalt (Co), nickel (Ni), zinc (Zn), and copper (Cu) is cited. With this structure, the anode active material particles 2A are bound to each other with the metal in between. As a result, pulverization of the anode active material particles 2A and falling of the anode active material particles 2A from the anode current collector 1 are hardly generated. Consequently, the conductivity between the anode current collector 1 and the anode active material particle 2A is further improved.

To improve the binding characteristics, the foregoing metal desirably fills in the gap between the adjacent anode active material particles 2A sufficiently. In this case, it is enough that part of the gap is filled in, but the filling amount is preferably large as much as possible, since thereby the binding characteristics of the anode active material layer 2 are further improved.

Such a metal may be bonded to the surface of the anode active material particle 2A in addition to the gap between the adjacent anode active material particles 2A. Thereby, the surface area of the anode active material particle 2A is decreased, and an irreversible coat that may inhibit electrode reaction is prevented from being generated. For example, in the case where the anode active material particle 2A is formed by vapor-phase deposition method or the like, fibrous minute projections are generated on the surface thereof, and thus many voids are generated between the projection sections. The voids cause increase in the surface area of the anode active material particle 2A. However, when the foregoing metal is previously provided, an irreversible coat generated on the surface of the anode active material particle 2A is decreased in the case where the anode functions as an anode in an electrochemical device such as a secondary battery.

Such a metal fills in the gap between the adjacent anode active material particles 2A by using vapor-phase deposition method or the like.

When the anode as the second modification is used for an electrochemical device such as a secondary battery, the cycle characteristics are improved.

Next, a description will be hereinafter given of a usage example of the foregoing anode. As an example of the electrochemical devices, secondary batteries are herein taken. The anode is used for the secondary batteries as follows.

First Secondary Battery

Figure 4:
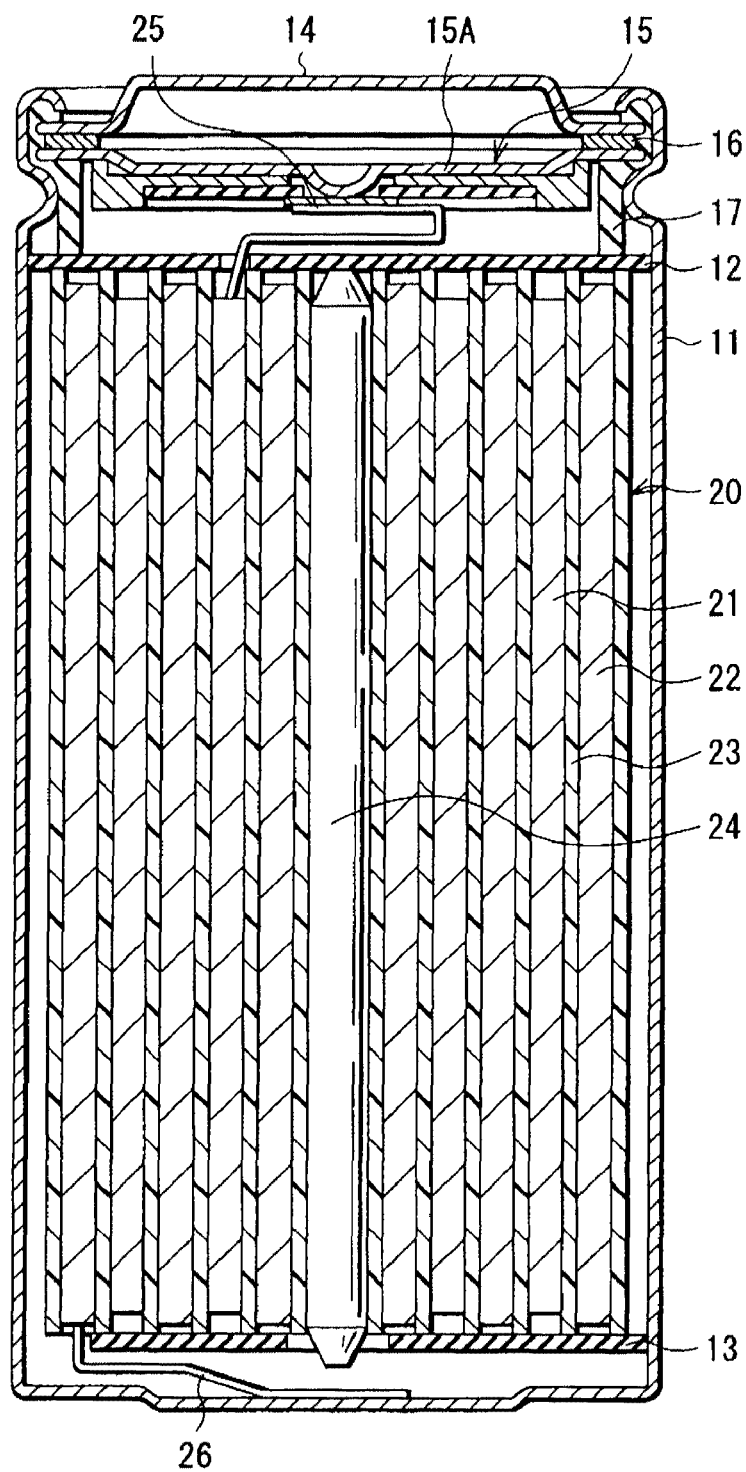
FIG. 4 is a cross section view showing a structure of a first secondary battery using the anode according to the embodiment of the invention.

FIG. 4 shows a cross sectional structure of a first secondary battery. The secondary battery is, for example, a lithium ion secondary battery in which the anode capacity is expressed based on insertion and extraction of lithium as an electrode reactant.

In the first secondary battery, a spirally wound electrode body 20 in which a cathode 21 and an anode 22 are layered with a separator 23 in between and spirally wound and a pair of insulating plates 12 and 13 are contained in a battery can 11 in the shape of an approximately hollow cylinder. The battery can 11 is made of, for example, iron plated by nickel. One end of the battery can 11 is closed, and the other end thereof is opened. The pair of insulating plates 12 and 13 is respectively arranged perpendicular to the winding periphery face, so that the spirally wound electrode body 20 is sandwiched between the insulating plates 12 and 13. The battery structure using the battery can 11 is so-called cylindrical type.

At the open end of the battery can 11, a battery cover 14, and a safety valve mechanism 15 and a Positive Temperature Coefficient (PTC) device 16 provided inside the battery cover 14 are attached by being caulked with a gasket 17. Inside of the battery can 11 is thereby hermetically closed. The battery cover 14 is, for example, made of a material similar to that of the battery can 11. The safety valve mechanism 15 is electrically connected to the battery cover 14 through the PTC device 16. If the internal pressure of the battery becomes a certain level or more due to internal short circuit, external heating or the like, a disk plate 15A flips to cut the electrical connection between the battery cover 14 and the spirally wound electrode body 20. If temperature rises, the PTC device 16 limits a current by increasing the resistance value to prevent abnormal heat generation resulting from a large current. The gasket 17 is made of, for example, an insulating material and its surface is coated with asphalt.

A center pin 24 is inserted in the center of the spirally wound electrode body 20. In the spirally wound electrode body 20, a cathode lead 25 made of aluminum or the like is connected to the cathode 21, and an anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

Figure 5:
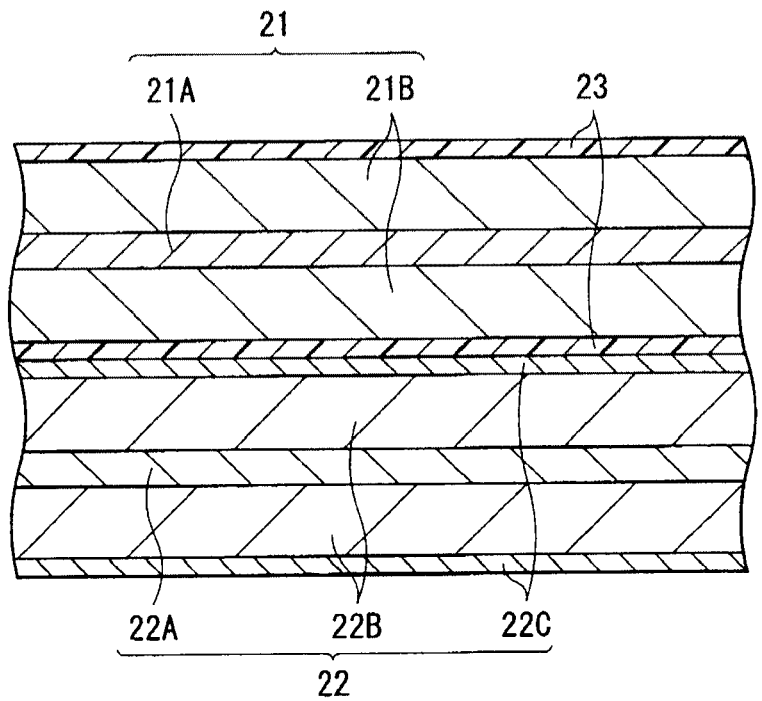
FIG. 5 is a cross section view showing an enlarged part of the spirally wound electrode body shown in FIG. 4.

FIG. 5 shows an enlarged part of the spirally wound electrode body 20 shown in FIG. 4. The cathode 21 has a structure in which, for example, a cathode active material layer 21B is provided on the both faces of a cathode current collector 21A. The cathode current collector 21A is made of, for example, a metal material such as aluminum, nickel, and stainless steel. The cathode active material layer 21B contains, as a cathode active material, for example, one or more cathode materials capable of inserting and extracting lithium as an electrode reactant. The cathode active material layer 21B may contain an electrical conductor, a binder and the like according to needs. In the case where the cathode active material layer 21B contains the binder, and the cathode 21 and the anode 22 are spirally wound as shown in FIG. 5, styrene-butadiene rubber, fluorinated rubber or the like having flexibility is preferably used as the binder thereof.

As the cathode material capable of inserting and extracting lithium, a lithium-containing compound is preferable, since thereby a high energy density is obtained. As the lithium-containing compound, for example, a complex oxide containing lithium and a transition metal element or a phosphate compound containing lithium and a transition metal element is cited. In particular, a compound containing at least one of cobalt, nickel, manganese, and iron as a transition metal element is preferable, since thereby a higher voltage is obtained. The chemical formula thereof is expressed by, for example, $Li_xM1O_2$ or $Li_yM2PO_4$. In the formula, M1 and M2 represent one or more transition metal elements. Values of x and y vary according to charge and discharge states of the secondary battery, and are generally in the range of $0.05 \leqq x \leqq 1.10$ and $0.05 \leqq y \leqq 1.10$.

As the lithium complex oxide containing lithium and a transition metal element, for example, a lithium-cobalt complex oxide ($Li_xCoO_2$), a lithium-nickel complex oxide ($Li_xNiO_2$), a lithium-nickel-cobalt complex oxide ($Li_xNi_{(1-z)}Co_zO_2$ (z<1)), a lithium-nickel-cobalt-manganese complex oxide ($Li_xNi_{(1-v-w)}Co_vMn_wO_2$ (v+w<1)), lithium-manganese complex oxide having a spinel type structure ($LiMn_2O_4$) and the like are cited. Specially, the complex oxide containing nickel is preferable, since thereby a high capacity and superior cycle characteristics are obtained. As the phosphate compound containing lithium and a transition metal element, for example, lithium-iron phosphate compound ($LiFePO_4$), a lithium-iron-manganese phosphate compound ($LiFe_{(1-u)}Mn_uPO_4$ (u<1)) and the like are cited.

In addition to the foregoing compounds, for example, an oxide such as titanium oxide, vanadium oxide, and manganese dioxide; a disulfide such as iron disulfide, titanium disulfide, and molybdenum disulfide; a chalcogenide such as niobium selenide; sulfur; and a conductive polymer such as polyaniline and polythiophene are cited.

The anode 22 has a structure similar to that of the anode shown in FIG. 1. The anode 22 has a structure in which an anode active material layer 22B and a coat 22C are provided on the both faces of a strip-shaped anode current collector 22A. Structures of the anode current collector 22A, the anode active material layer 22B, and the coat 22C are respectively similar to the structures of the anode current collector 1, the anode active material layer 2, and the coat 3 described above.

In the first secondary battery, the charge capacity of the anode active material is larger than the charge capacity of the cathode active material by adjusting the amount of the cathode active material and the amount of the anode active material capable of inserting and extracting lithium. Thus, a lithium metal is not precipitated on the anode 22 when fully charged.

The separator 23 separates the cathode 21 from the anode 22, prevents current short circuit due to contact of both electrodes, and passes lithium ions. The separator 23 is made of, for example, a porous film made of a synthetic resin such as polytetrafluoroethylene, polypropylene, and polyethylene, or a ceramic porous film. The separator 23 may have a structure in which two or more of the foregoing porous films are layered. Specially, the porous film made of polyolefin is preferable, since such a film has a superior short circuit preventive effect and improves safety of the secondary battery by shutdown effect. In particular, polyethylene is preferable, since polyethylene provides shutdown effect at from 100 deg C. to 160 deg C. and has superior electrochemical stability. Further, polypropylene is also preferable. In addition, as long as chemical stability is secured, a resin formed by copolymerizing or blending with polyethylene or polypropylene may be used.

An electrolytic solution as a liquid electrolyte is impregnated in the separator 23. The electrolytic solution contains a solvent and an electrolyte salt dissolved in the solvent.

The solvent contains, for example, a nonaqueous solvent such as an organic solvent. The nonaqueous solvents include, for example, ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethyl methyl acetate, trimethyl ethyl acetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide and the like are cited. The solvent may be used singly, or a plurality thereof may be used by mixture. Specially, the solvent preferably contains at least one selected from the group consisting of ethylene carbonate, propylene carbonate, dimethyl carbonate, diethyl carbonate, and ethyl methyl carbonate. Thereby, sufficient cycle characteristics are obtained. In this case, in particular, a mixture of a high-viscosity (high dielectric constant) solvent (for example, specific inductive $\epsilon \geqq 30$) such as ethylene carbonate and propylene carbonate and a low-viscosity solvent (for example, viscosity $\leqq 1$ mPa·s) such as dimethyl carbonate, ethyl methyl carbonate, and diethyl carbonate is preferably contained. Thereby, the dissociation property of the electrolyte salt and the ion mobility are improved, and thus higher effects are obtained.

The solvent preferably contains a cyclic ester carbonate having an unsaturated bond, since thereby the cycle characteristics are improved. The content of the cyclic ester carbonate having an unsaturated bond in the solvent is preferably in the range from 0.01 wt % to 10.0 wt %, since thereby sufficient effects are obtained. As the cyclic ester carbonate having an unsaturated bond, for example, vinylene carbonate, vinylethylene carbonate and the like are cited. One thereof may be used singly, or a plurality thereof may be used by mixture.

Further, the solvent preferably contains at least one selected from the group consisting of a chain ester carbonate having halogen as an element shown in Chemical formula 2 and a cyclic ester carbonate having halogen as an element shown in Chemical formula 3. Thereby, the cycle characteristics are further improved.

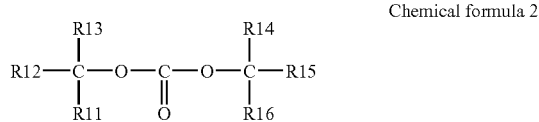

Chemical formula 2

In the formula, R11 to R16 represent a hydrogen group, a halogen group, an alkyl group, or an alkyl halide group. R11 to R16 may be identical or different. However, at least one of R11 to R16 is the halogen group or the alkyl halide group. Halogen is at least one selected from the group consisting of fluorine, chlorine, and bromine.

Chemical formula 3

In the formula, R21 to R24 represent a hydrogen group, a halogen group, an alkyl group, or an alkyl halide group. R21 to R24 may be identical or different. However, at least one of R21 to R24 is the halogen group or the alkyl halide group. Halogen is at least one selected from the group consisting of fluorine, chlorine, and bromine.

As the chain ester carbonate having halogen shown in Chemical formula 2, for example, fluoromethyl methyl carbonate, bis(fluoromethyl)carbonate, difluoromethyl methyl carbonate or the like is cited. One thereof may be used singly, or a plurality thereof may be used by mixture. Specially, bis(fluoromethyl)carbonate is preferable, since thereby sufficient effects are obtained. In particular, when bis(fluoromethyl)carbonate is used together with the cyclic ester carbonate having halogen shown in Chemical formula 3, higher effects are obtained.

As the cyclic ester carbonate having halogen shown in Chemical formula 3, for example, the compounds shown in Chemical formulas 4(1) to 5(9) is cited. That is, 4-fluoro-1,3-dioxolane-2-one of Chemical formula 4(1), 4-chloro-1,3-dioxolane-2-one of Chemical formula 4(2), 4,5-difluoro-1,3-dioxolane-2-one of Chemical formula 4(3), tetrafluoro-1,3-dioxolane-2-one of Chemical formula 4(4), 4-fluoro-5-chloro-1,3-dioxolane-2-one of Chemical formula 4(5), 4,5-dichloro-1,3-dioxolane-2-one of Chemical formula 4(6), tetrachloro-1,3-dioxolane 2-one of Chemical formula 4(7), 4,5-bis trifluoro methyl-1,3-dioxolane 2-one of Chemical formula 4(8), 4-trifuloro methyl-1,3-dioxolane-2-one of Chemical formula 4(9), 4,5-difluoro-4,5-dimethyl-1,3-dioxolane-2-one of Chemical formula 4(10), 4-methyl-5,5-difluoro-1,3-dioxolane-2-one of Chemical formula 4(11), 4-ethyl-5,5-difluoro-1,3-dioxolane-2-one of Chemical formula 4(12) and the like is cited. Further, 4-trifluoromethyl-5-fluoro-1,3-dioxolane-2-one of Chemical formula 5(1), 4-trifluoromethyl-5-methyl-1,3-dioxolane-2-one of Chemical formula 5(2), 4-fluoro-4,5-dimethyl-1,3-dioxolane-2-one of Chemical formula 5(3), 4,4-difluoro-5-(1,1-difluoroethyl)-1,3-dioxolane-2-one of Chemical formula 5(4), 4,5-dichloro-4,5-dimethyl-1,3-dioxolane-2-one of Chemical formula 5(5), 4-ethyl-5-fluoro-1,3-dioxolane-2-one of Chemical formula 5(6), 4-ethyl-4,5-difluoro-1,3-dioxolane-2-one of Chemical formula 5(7), 4-ethyl-4,5,5-trifluoro-1,3-dioxolane-2-one of Chemical formula 5(8), 4-fluoro-4-trifluoromethyl-1,3-dioxolane-2-one of Chemical formula 5(9) and the like are cited. One thereof may be used singly, or a plurality thereof may be used by mixture. Specially, at least one of 4-fluoro-1,3-dioxolane-2-one and 4,5-difluoro-1,3-dioxolane-2-one is preferable. 4,5-difluoro-1,3-dioxolane-2-one is preferable to 4-fluoro-1,3-dioxolane-2-one, since 4,5-difluoro-1,3-dioxolane-2-one is easily available, and provides higher effects. In particular, as 4,5-difluoro-1,3-dioxolane-2-one, a trans isomer is more preferable than a cis isomer to obtain higher effects.

Chemical formula 4

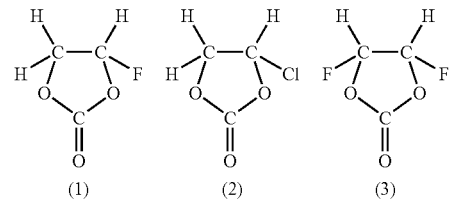

(1) (2) (3)

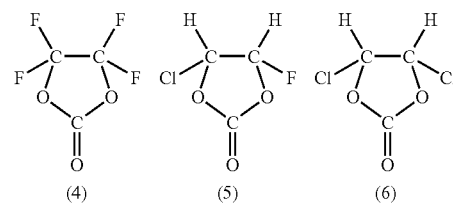

(4) (5) (6)

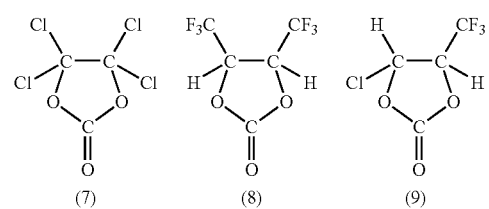

(7) (8) (9)

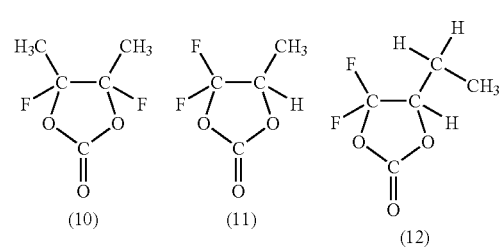

(10) (11) (12)

Chemical formula 5

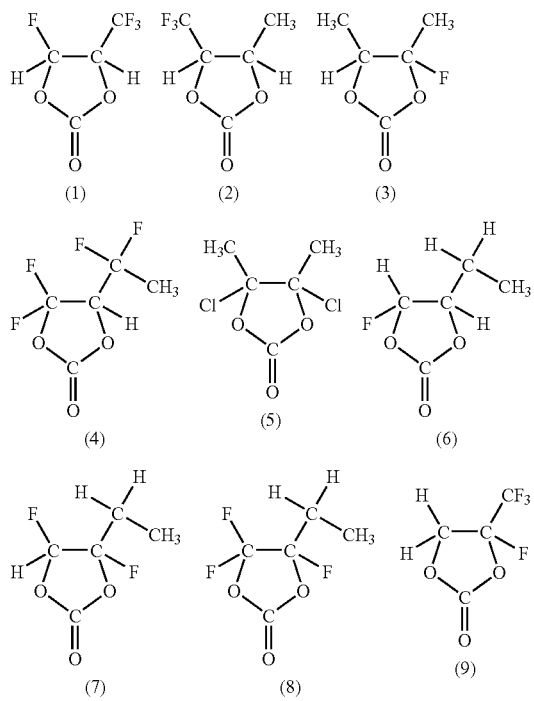

Chemical formula 6

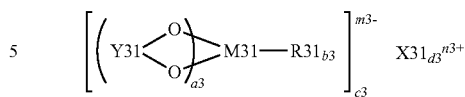

In the formula, X31 represents a Group 1 element or a Group 2 element in the long period periodic table or aluminum (Al). M31 represents a transition metal element, a Group 13 element, a Group 14 element, or a Group 15 element in the long period periodic table. R31 represents a halogen group. Y31 represents —OC—R32-CO—, —OC—CR33$_2$-, or —OC—CO—. R32 represents an alkylene group, an alkylene halide group, an arylene group, or an arylene halide group. R33 represents an alkyl group, an alkyl halide group, an aryl group, or an aryl halide group, and may be identical or different. a3 represents one of integer numbers 1 to 4. b3 represents 0, 2, or 4. c3, d3, m3, and n3 represent one of integer numbers 1 to 3.

Chemical formula 7

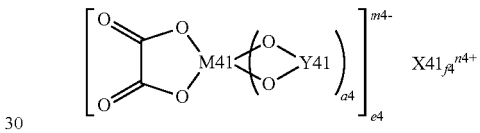

In the formula, X41 represents a Group 1 element or a Group 2 element in the long period periodic table. M41 represents a transition metal element, a Group 13 element, a Group 14 element, or a Group 15 element in the long period periodic table. Y41 represents —OC—(CR41$_2$)$_{b4}$-CO—, —R43$_2$C—(CR42$_2$)$_{c4}$-CO—, —R43$_2$C—(CR42$_2$)$_{c4}$-CR43$_2$-, —R43$_2$C—(CR42$_2$)$_{c4}$-SO$_2$—, —O$_2$S—(CR42$_2$)$_{d4}$-SO$_2$—, or —OC—(CR42$_2$)$_{d4}$-SO$_2$—, R41 and R43 represent a hydrogen group, an alkyl group, a halogen group, or an alkyl halide group. R41 and R43 may be respectively identical or different, but at least one of them is respectively the halogen group or the alkyl halide group. R42 represents a hydrogen group, an alkyl group, a halogen group, or an alkyl halide group, and may be identical or different. a4, e4, and n4 represent an integer number of 1 or 2. b4 and d4 represent one of integer numbers 1 to 4. c4 represents one of integer numbers 0 to 4. f4 and m4 represent one of integer numbers 1 to 3.

Further, the solvent preferably contains sultone (cyclic ester sulfonate) or an acid anhydride. Thereby, the cycle characteristics are further improved. As the sultone, for example, propane sultone, propene sultone or the like is cited. One thereof may be used singly, or a plurality thereof may be used by mixture. Specially, propene sultone is preferable, since thereby sufficient effects are obtained. Meanwhile, as the acid anhydride, for example, a carboxylic anhydride such as succinic anhydride, a disulfonic anhydride such as anhydrous ethane disulfonic acid, an anhydride of an carboxylic acid and a sulfonic acid such as anhydrous sulfobenzoic acid or the like is cited. One thereof may be used singly, or a plurality thereof may be used by mixture. Specially, succinic anhydride or anhydrous sulfobenzoic acid is preferable, since thereby sufficient effects are obtained.

The electrolyte salt contains, for example, one or more light metal salts such as a lithium salt. As the lithium salt, for example, at least one selected from the group consisting of lithium hexafluorophosphate, lithium tetrafluoroborate, lithium perchlorate, and lithium hexafluoroarsenate is cited, since thereby sufficient cycle characteristics are obtained. One thereof may be used singly, or a plurality thereof may be used by mixture. Specially, lithium hexafluorophosphate is preferable, since the internal resistance is lowered, and thus higher effects are obtained.

The electrolyte salt preferably contains at least one selected from the group consisting of the compounds shown in Chemical formulas 6 to 8. Thereby, the cycle characteristics are further improved. One thereof may be used singly, or a plurality thereof may be used by mixture. In particular, when the electrolyte contains the foregoing lithium hexafluorophosphate or the like and at least one selected from the group consisting of the compounds shown in Chemical formulas 6 to 8, higher effects are obtained.

Chemical formula 8

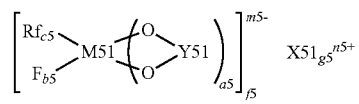

In the formula, X51 represents a Group 1 element or a Group 2 element in the long period periodic table. M51 represents a transition metal element, a Group 13 element, a Group 14 element, or a Group 15 element in the long period periodic table. Rf represents a fluorinated alkyl group with the carbon number in the range from 1 to 10 or a fluorinated aryl group with the carbon number in the range from 1 to 10. Y51 represents —OC—(CR51$_2$)$_{d5}$-CO—, —R52$_2$C—(CR51$_2$)$_{d5}$-CO—, —R52$_2$C—(CR51$_2$)$_{d5}$-CR52$_2$—, —R52$_2$C—(CR51$_2$)$_{d5}$-SO$_2$—, —O$_2$S—(CR51$_2$)$_{e5}$-SO$_2$—, or —OC—(CR51$_2$)$_{e5}$-SO$_2$—. R51 represents a hydrogen group, an alkyl group, a halogen group, or an alkyl halide group, and may be identical or different. R52 represents a hydrogen group, an alkyl group, a halogen group, or an alkyl halide group, may be identical or different, but at least one thereof is the halogen group or the alkyl halide group. a5, f5, and n5 represent 1 or 2. b5 c5, and e5 represent one of integer numbers 1 to 4. d5 represents one of integer numbers 0 to 4. g5 and m5 represent one of integer numbers 1 to 3.

The long period periodic table is shown in Inorganic Chemical Nonmenclature System (revised version) advocated by International Union of Pure and Applied Chemistry (IUPAC). Specifically, the Group 1 element represents hydrogen, lithium, sodium, potassium, rubidium, cesium, or francium. The Group 2 element represents beryllium, magnesium, calcium, strontium, barium, or radium. The Group 13 element represents boron, aluminum, gallium, indium, or thallium. The Group 14 element represents carbon, silicon, germanium, tin, or lead. The Group 15 element represents nitrogen, phosphorus, arsenic, antimony, or bismuth.

As a compound shown in Chemical formula 6, for example, the compounds shown in Chemical formulas 9(1) to 9(6) is cited. As a compound shown in Chemical formula 7, for example, the compounds shown in Chemical formulas 10(1) to 10(8) is cited. As a compound shown in Chemical formula 8, for example, the compound shown in Chemical formulas 10(9) or the like is cited. One of the foregoing compounds may be used singly, or a plurality thereof may be used by mixture. Specially, as a compound shown in Chemical formulas 6 to 8, the compound shown in Chemical formula 9(6) or the compound shown in Chemical formula 10(2) is preferable, since thereby sufficient effects are obtained. It is needless to say that the compound is not limited to the compounds shown in Chemical formulas 9 and 10, and the compound may be other compound as long as such a compound has the structure shown in Chemical formulas 6 to 8.

Chemical formula 9

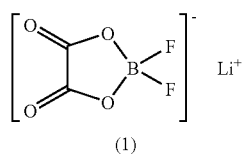

(1)

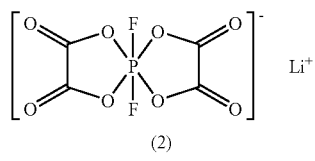

(2)

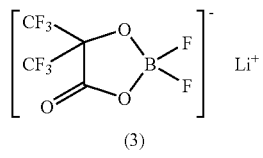

(3)

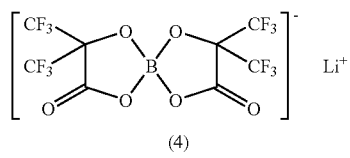

(4)

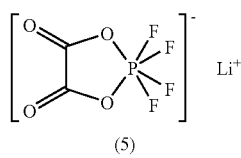

(5)

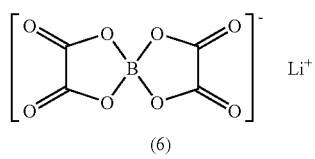

(6)

Chemical formula 10

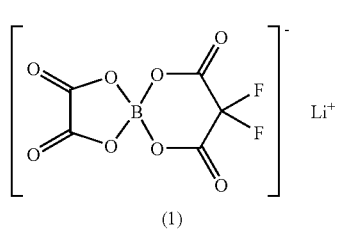

(1)

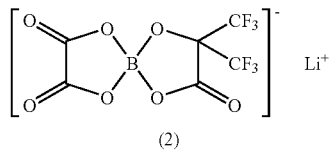

(2)

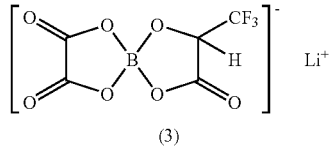

(3)

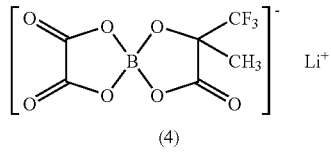

(4)

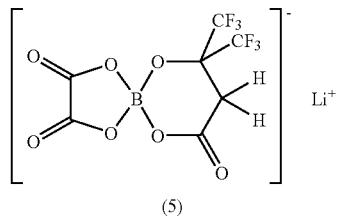

(5)

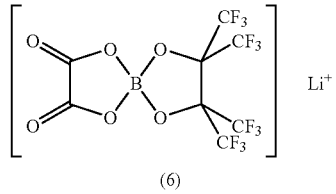

(6)

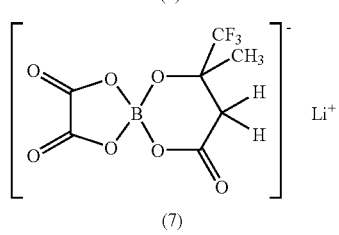

(7)

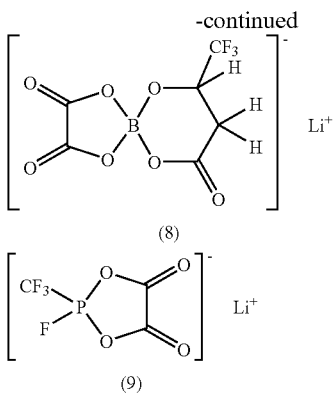

(8)

(9)

The electrolyte salt preferably contains at least one selected from the group consisting of the compounds shown in Chemical formulas 11 to 13. Thereby, the cycle characteristics are further improved. One thereof may be used singly, or a plurality thereof may be used by mixture. In particular, when the electrolyte salt contains the foregoing lithium hexafluorophosphate or the like and at least one selected from the group consisting of the compounds shown in Chemical formulas 11 to 13, higher effects are obtained.

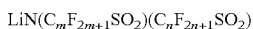

Chemical formula 11 where m and n represent an integer number of 1 or more, and m and n may be identical or different.

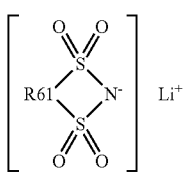

Chemical formula 12 where R61 represents a straight chain or branched perfluoro alkylene group with the carbon number in the range from 2 to 4.

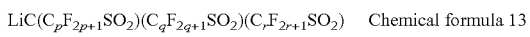

Chemical formula 13 where p, q, and r represent an integer number of 1 or more, and p, q, and r may be identical or different.

As the chain compound shown in Chemical formula 11, for example, lithium bis(trifluoromethanesulfonyl)imide (LiN($CF_3SO_2$)$_2$), lithium bis(pentafluoroethanesulfonyl)imide (LiN($C_2F_5SO_2$)$_2$), lithium (trifluoromethanesulfonyl)(pentafluoroethanesulfonyl)imide (LiN($CF_3SO_2$)($C_2F_5SO_2$)), lithium (trifluoromethanesulfonyl)(heptafluoropropanesulfonyl)imide (LiN($CF_3SO_2$)($C_3F_7SO_2$)), lithium (trifluoromethanesulfonyl) (nonafluorobutanesulfonyl)imide (LiN($CF_3SO_2$)($C_4F_9SO_2$)) or the like is cited. One thereof may be used singly, or a plurality thereof may be used by mixture.

As the cyclic compound shown in Chemical formula 12, for example, the compounds shown in Chemical formula 14 is cited. That is, lithium 1,2-perfluoroethanedisulfonylimide shown in Chemical formula 14(1), lithium 1,3-perfluoropropanedisulfonylimide shown in Chemical formula 14(2), lithium 1,3-perfluorobutanedisulfonylimide shown in Chemical formula 14(3), lithium 1,4-perfluorobutanedisulfonylimide shown in Chemical formula 14(4) or the like is cited. One thereof may be used singly, or a plurality thereof may be used by mixture. Specially, lithium 1,3-perfluoropropanedisulfonylimide is preferable, since thereby sufficient effects are obtained.

Chemical formula 14

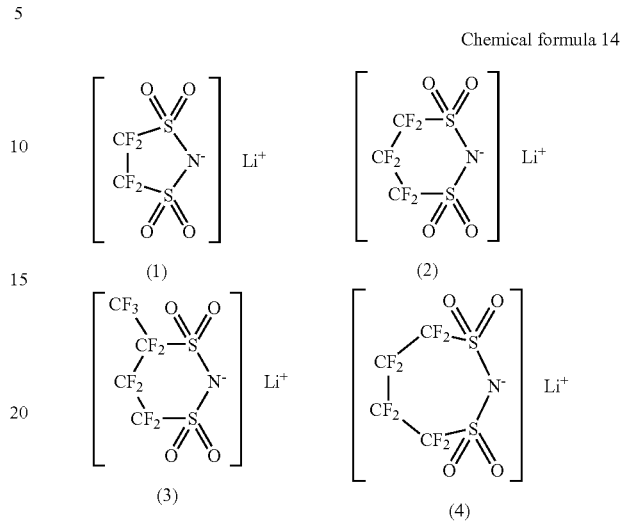

As the chain compound shown in Chemical formula 13, for example, lithium tris(trifluoromethanesulfonyl)methyde (LiC($CF_3SO_2$)$_3$) or the like is cited.

The content of the electrolyte salt to the solvent is preferably in the range from 0.3 mol/kg to 3.0 mol/kg. If the content is out of the foregoing range, there is a possibility that the ion conductivity is significantly lowered and thus sufficient battery characteristics and the like may not be obtained.

The first secondary battery may be manufactured, for example, as follows.

First, the cathode 21 is formed by forming the cathode active material layer 21B on the both faces of the cathode current collector 21A. In this case, cathode active material powder, an electrical conductor, and a binder are mixed to prepare a cathode mixture, which is dispersed in a solvent to obtain paste cathode mixture slurry. Then, the cathode current collector 21A is coated with the cathode mixture slurry, which is dried, and the resultant is compression-molded. Further, for example, according to a procedure similar to that of the foregoing method of manufacturing the anode, the anode 22 is formed by forming the anode active material layer 22B on the both faces of the anode current collector 22A, and then forming the coat 22C on the anode active material layer 22B.

Subsequently, the cathode lead 25 is attached to the cathode current collector 21A by being welded, and the anode lead 26 is attached to the anode current collector 22A by being welded. Subsequently, the cathode 21 and the anode 22 are spirally wound with the separator 23 in between, and thereby the spirally wound electrode body 20 is formed. The end of the cathode lead 25 is welded to the safety valve mechanism 15, and the end of the anode lead 26 is welded to the battery can 11. After that, the spirally wound electrode body 20 is sandwiched between the pair of insulating plates 12 and 13, and contained inside the battery can 11. Subsequently, an electrolytic solution is injected into the battery can 11 and impregnated in the separator 23. Finally, at the open end of the battery can 11, the battery cover 14, the safety valve mechanism 15, and the PTC device 16 are fixed by being caulked with the gasket 17. The secondary battery shown in FIG. 4 and FIG. 5 is thereby fabricated.

In the first secondary battery, when charged, for example, lithium ions are extracted from the cathode 21 to the electrolytic solution. Then, while the coat 22C inhibits decomposition of the electrolytic solution, the extracted lithium ions effectively pass through the coat 22C and are inserted in the anode active material layer 22B. Meanwhile, when discharged, for example, lithium ions are extracted from the anode active material layer 22B, and inserted in the cathode 21 through the electrolytic solution.

According to the first secondary battery and the method of manufacturing the same, the anode 22 has the structure similar to that of the anode shown in FIG. 1 described above, and is formed by the method similar to that of the method of manufacturing the anode described above. Therefore, the cycle characteristics are improved.

In particular, when the solvent contains at least one selected from the group consisting of the cyclic ester carbonate having an unsaturated bond, the chain ester carbonate having halogen shown in Chemical formula 2, and the cyclic ester carbonate having halogen shown in Chemical formula 3; sultone; or the acid anhydride, higher effects are obtained.

Further, when the electrolyte salt contains at least one selected from the group consisting of the compounds shown in Chemical formulas 6 to 8 or at least one selected from the group consisting of the compounds shown in Chemical formulas 11 to 13, higher effects are obtained.

Figure 6:
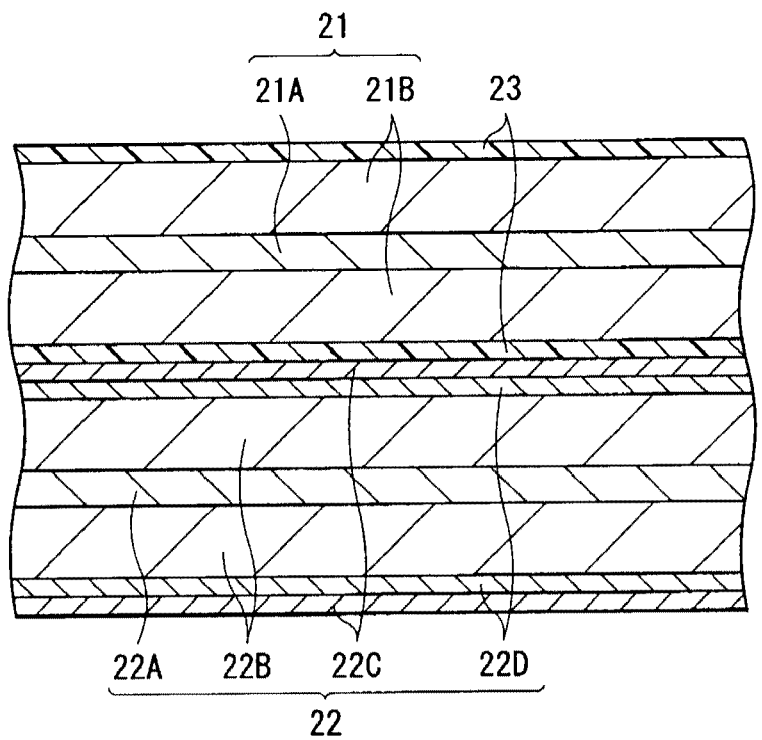
FIG. 6 is a cross section view showing a modification of the structure of the first secondary battery.

As shown in FIG. 6 corresponding to FIG. 5, the anode 22 may have a structure similar to that of anode shown in FIG. 2. The anode 22 in this case further has an oxide coat 22D between the anode active material layer 22B and the coat 22C. The structure of the oxide coat 22D is similar to that of the foregoing oxide coat 4. In this case, compared to a case not using the oxide coat 22D, the chemical stability of the anode 22 is improved. Thus, the cycle characteristics are further improved.

Further, the anode 22 may have a structure similar to that of the anode as the second modification shown in FIG. 3. In this case, since the electric conductivity between the anode current collector 1 and the anode active material layer 2 is improved, the cycle characteristics are further improved.

It is conceivable that the ionic polymer containing lithium is used as a binder in the anode. However, in this case, the chemical stability is not sufficiently improved. In addition, characteristics such as binding force, elasticity, tensibility, workability, and solubility; and physical properties in the case of using slurry state are limited. Meanwhile, in this embodiment, since the coat 22C is provided separately from the anode active material layer 22B, a material specialized in the performance as improvement of chemical stability may be selected.

Second Secondary Battery

Figure 7:
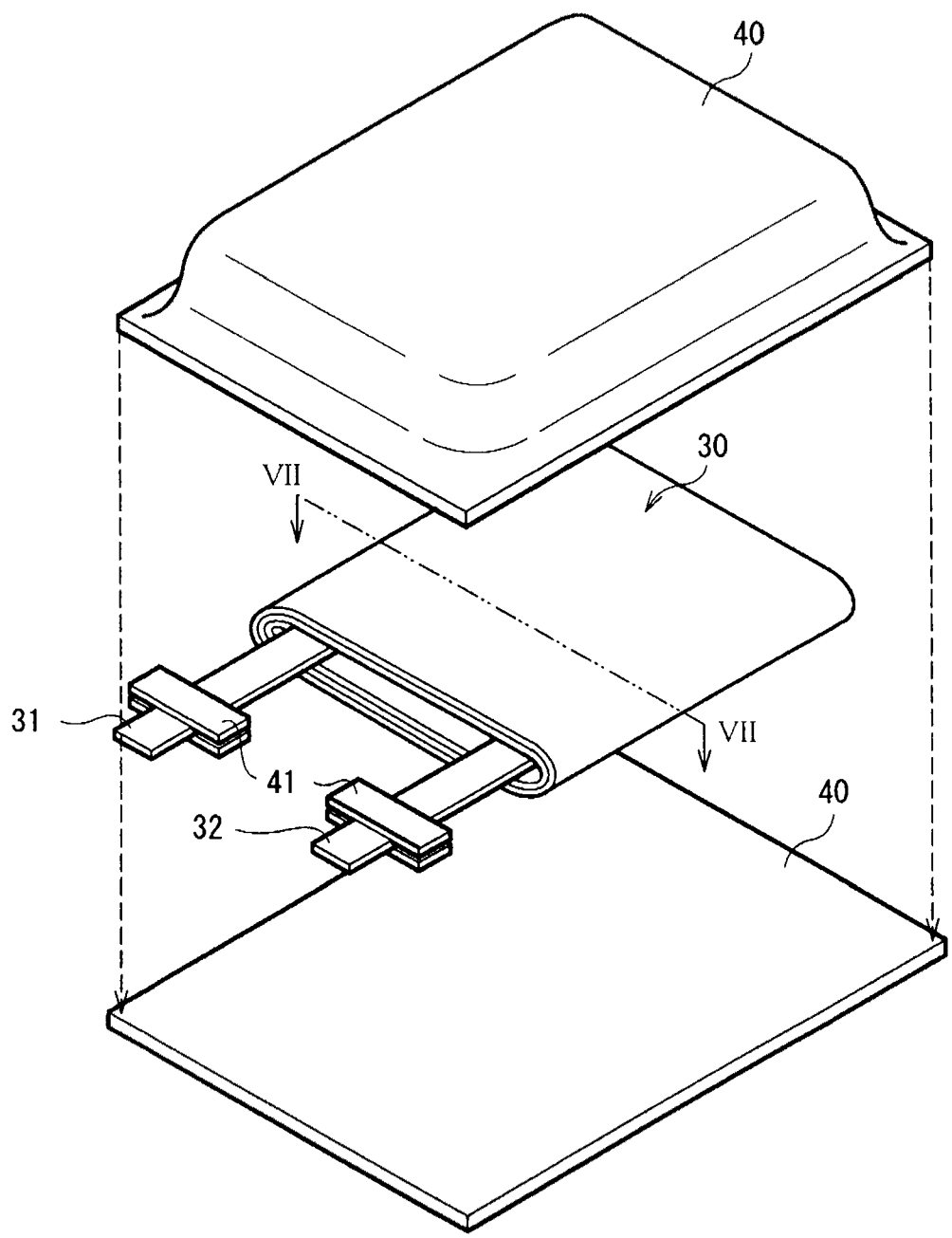
FIG. 7 is an exploded perspective view showing a structure of a second secondary battery using the anode according to the embodiment of the invention.

FIG. 7 shows an exploded perspective structure of a second secondary battery. In the second secondary battery, a spirally wound electrode body 30 to which a cathode lead 31 and an anode lead 32 are attached is contained in a film package member 40. The battery structure using the film package member 40 is so-called laminated film type.

The cathode lead 31 and the anode lead 32 are respectively derived in the same direction from inside to outside of the package member 40. The cathode lead 31 is made of, for example, a metal material such as aluminum, and the anode lead 32 is made of, for example, a metal material such as copper, nickel, and stainless. Each metal material composing the cathode lead 31 and the anode lead 32 is in the shape of, for example, a thin plate or mesh.

The package member 40 is made of a rectangular aluminum laminated film in which, for example, a nylon film, an aluminum foil, and a polyethylene film are bonded together in this order. In the package member 40, for example, the polyethylene film and the spirally wound electrode body 30 are opposed to each other, and the respective outer edges are contacted to each other by fusion bonding or an adhesive. Adhesive films 41 to protect from entering of outside air are inserted between the package member 40 and the cathode lead 31, the anode lead 32. The adhesive film 41 is made of a material having contact characteristics to the cathode lead 31 and the anode lead 32, for example, a polyolefin resin such as polyethylene, polypropylene, modified polyethylene, and modified polypropylene.

The package member 40 may be made of a laminated film having other structure, a polymer film made of polypropylene or the like, or a metal film, instead of the foregoing three-layer aluminum laminated film.

Figure 8:
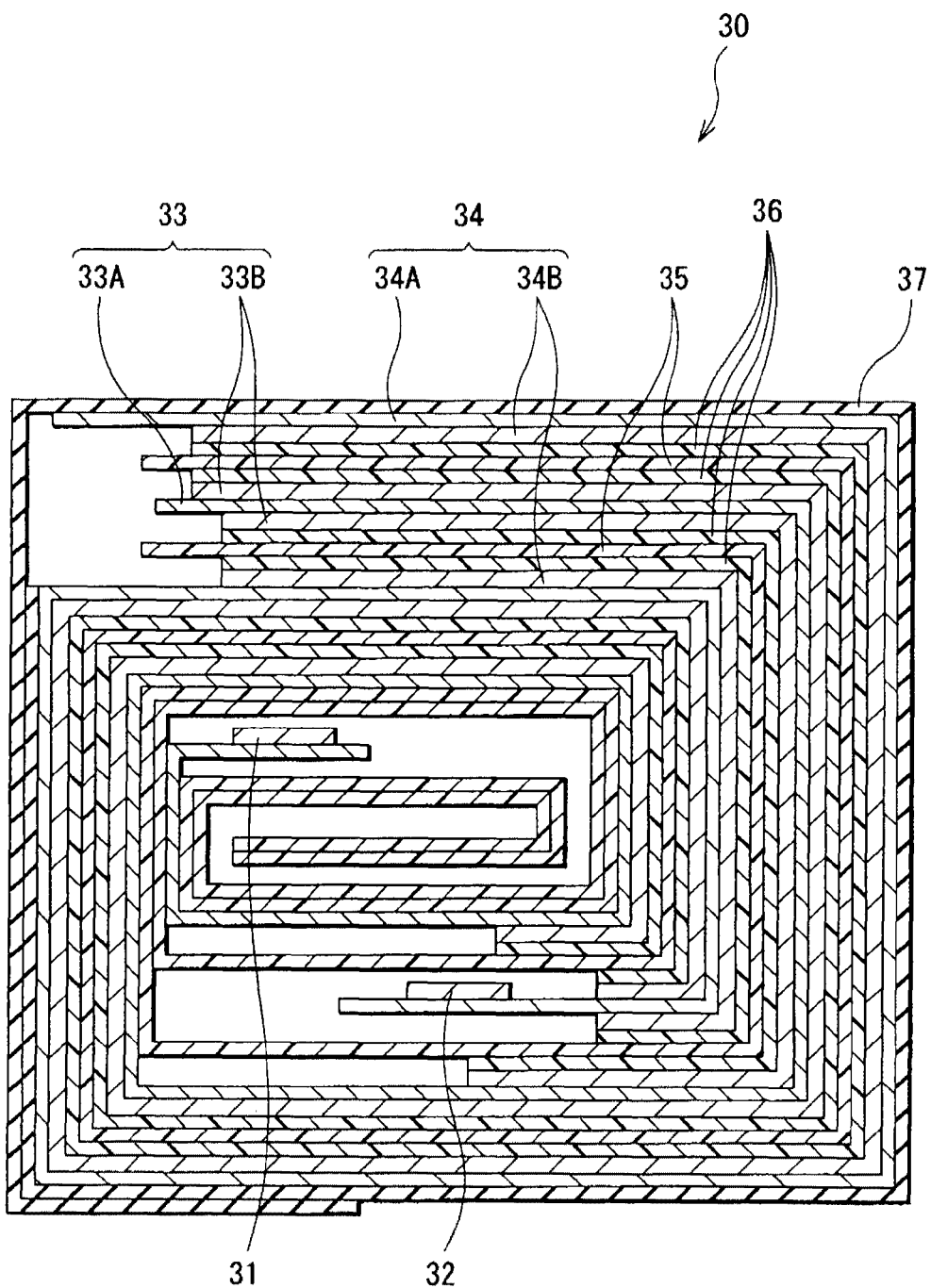
FIG. 8 is a cross section view showing a structure taken along line VII-VII of the spirally wound electrode body shown in FIG. 7.

FIG. 8 shows a cross sectional structure taken along line VII-VII of the spirally wound electrode body 30 shown in FIG. 7. In the spirally wound electrode body 30, a cathode 33 and an anode 34 are layered with a separator 35 and an electrolyte 36 in between and then spirally wound. The outermost periphery thereof is protected by a protective tape 37.

Figure 9:
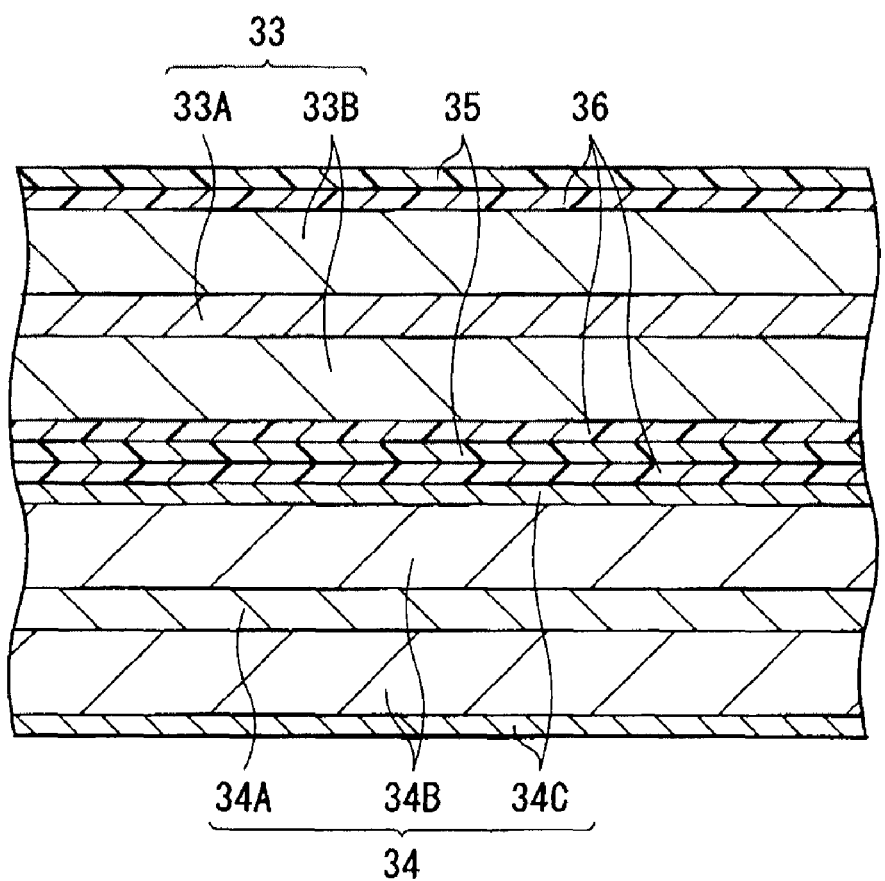
FIG. 9 is a cross section view showing an enlarged part of the spirally wound electrode body shown in FIG. 8.

FIG. 9 shows an enlarged part of the spirally wound electrode body 30 shown in FIG. 8. The cathode 33 has, for example, a structure in which a cathode active material layer 33B is provided on the both faces of a cathode current collector 33A. The anode 34 has, for example, a structure similar to that of the anode shown in FIG. 1. The anode 34 has a structure in which an anode active material layer 34B and a coat 34C are provided on the both faces of an anode current collector 34A. Structures of the cathode current collector 33A, the cathode active material layer 33B, the anode current collector 34A, the anode active material layer 34B, the coat 34C, and the separator 35 are respectively similar to those of the cathode current collector 21A, the cathode active material layer 21B, the anode current collector 22A, the anode active material layer 22B, the coat 22C, and the separator 23 in the first secondary battery described above.

The electrolyte 36 is so-called gelatinous, containing an electrolytic solution and a polymer compound that holds the electrolytic solution. The gel electrolyte is preferable, since a high ion conductivity (for example, 1 mS/cm or more at room temperature) is thereby obtained, and leakage of the secondary battery is thereby prevented.

As the polymer compound, for example, an ether polymer compound such as polyethylene oxide and a cross-linked body containing polyethylene oxide, an ester polymer compound such as polymethacrylate or an acrylate polymer compound, or a polymer of vinylidene fluoride such as polyvinylidene fluoride and a copolymer of vinylidene fluoride and hexafluoropropylene are cited. One thereof may be used singly, or a plurality thereof may be used by mixture. In particular, in terms of redox stability, the fluorinated polymer compound such as the polymer of vinylidene fluoride or the like is preferable. The additive amount of the polymer compound in the electrolyte 36 varies according to compatibility between the electrolytic solution and the polymer compound, but, for example, is preferably in the range from 5 wt % to 50 wt %.

The composition of the electrolytic solution is similar to the composition of the electrolytic solution in the foregoing first secondary battery. However, the solvent in this case means a wide concept including not only the liquid solvent but also a solvent having ion conductivity capable of dissociating the electrolyte salt. Therefore, when the polymer compound having ion conductivity is used, the polymer compound is also included in the solvent.

Instead of the electrolyte 36 in which the electrolytic solution is held by the polymer compound, the electrolytic solution may be directly used. In this case, the electrolytic solution is impregnated in the separator 35.

The second secondary battery may be manufactured, for example, by the following three manufacturing methods.

In the first manufacturing method, first, the cathode 33 is formed by forming the cathode active material layer 33B on the both faces of the cathode current collector 33A by a procedure similar to that of the method of manufacturing the first secondary battery. Further, for example, the anode 34 is fabricated by forming the anode active material layer 34B and the coat 34C on the both faces of the anode current collector 34A by a procedure similar to that of the method of manufacturing the anode described above.

Subsequently, a precursor solution containing an electrolytic solution, a polymer compound, and a solvent is prepared. After the cathode 33 and the anode 34 are coated with the precursor solution, the solvent is volatilized to form the gel electrolyte 36. Subsequently, the cathode lead 31 and the anode lead 32 are respectively attached to the cathode current collector 33A and the anode current collector 34A. Subsequently, the cathode 33 and the anode 34 provided with the electrolyte 36 are layered with the separator 35 in between to obtain a laminated body. After that, the laminated body is spirally wound in the longitudinal direction, the protective tape 37 is adhered to the outermost periphery thereof to form the spirally wound electrode body 30. Subsequently, for example, after the spirally wound electrode body 30 is sandwiched between two pieces of the film package members 40, outer edges of the package members 40 are contacted by thermal fusion bonding or the like to enclose the spirally wound electrode body 30. Then, the adhesive films 41 are inserted between the cathode lead 31, the anode lead 32 and the package member 40. Thereby, the secondary battery shown in FIG. 7 to FIG. 9 is fabricated.

In the second manufacturing method, first, the cathode lead 31 and the anode lead 32 are respectively attached to the cathode 33 and the anode 34. After that, the cathode 33 and the anode 34 are layered with the separator 35 in between and spirally wound. The protective tape 37 is adhered to the outermost periphery thereof, and thereby a spirally wound body as a precursor of the spirally wound electrode body 30 is formed. Subsequently, after the spirally wound body is sandwiched between two pieces of the film package members 40, the outermost peripheries except for one side are thermally fusion-bonded to obtain a pouched state, and the spirally wound body is contained in the pouch-like package member 40. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 40. After that, the opening of the package member 40 is hermetically sealed by thermal fusion bonding or the like. Finally, the monomer is thermally polymerized to obtain a polymer compound. Thereby, the gel electrolyte 36 is formed. Accordingly, the secondary battery is fabricated.

In the third manufacturing method, the spirally wound body is formed and contained in the pouch-like package member 40 in the same manner as that of the foregoing first manufacturing method, except that the separator 35 with the both faces coated with a polymer compound is used. As the polymer compound applying to the separator 35, for example, a polymer containing vinylidene fluoride as a component, that is, a homopolymer, a copolymer, a multicomponent copolymer and the like are cited. Specifically, polyvinylidene fluoride, a binary copolymer containing vinylidene fluoride and hexafluoropropylene as a component, a ternary copolymer containing vinylidene fluoride, hexafluoropropylene, and chlorotrifluoroethylene as a component and the like are cited. As a polymer compound, in addition to the foregoing polymer containing vinylidene fluoride as a component, another one or more polymer compounds may be included. Subsequently, an electrolytic solution is prepared and injected into the package member 40. After that, the opening of the package member 40 is sealed by thermal fusion bonding or the like. Finally, the resultant is heated while a weight is applied to the package member 40, and the separator 35 is contacted to the cathode 33 and the anode 34 with the polymer compound in between. Thereby, the electrolytic solution is impregnated into the polymer compound, and the polymer compound is gelated to form the electrolyte 36. Accordingly, the secondary battery is fabricated. In the third manufacturing method, the swollenness characteristics are more improved than in the first manufacturing method. Further, in the third manufacturing method, the monomer, the solvent and the like as a raw material of the polymer compound are hardly left in the electrolyte 36 compared to the second manufacturing method, and the formation step of the polymer compound is favorably controlled. Thus, sufficient contact characteristics are obtained between the cathode 33/the anode 34/the separator 35 and the electrolyte 36.

In the second secondary battery, as in the foregoing first secondary battery, lithium ions are inserted and extracted between the cathode 33 and the anode 34. That is, when charged, for example, lithium ions are extracted from the cathode 33 and inserted in the anode 34 through the electrolyte 36. Meanwhile, when discharged, lithium ions are extracted from the anode 34, and inserted in the cathode 33 through the electrolyte 36.

Actions and effects of the second secondary battery and the method of manufacturing the secondary battery are similar to those of the foregoing first secondary battery.

Figure 10:
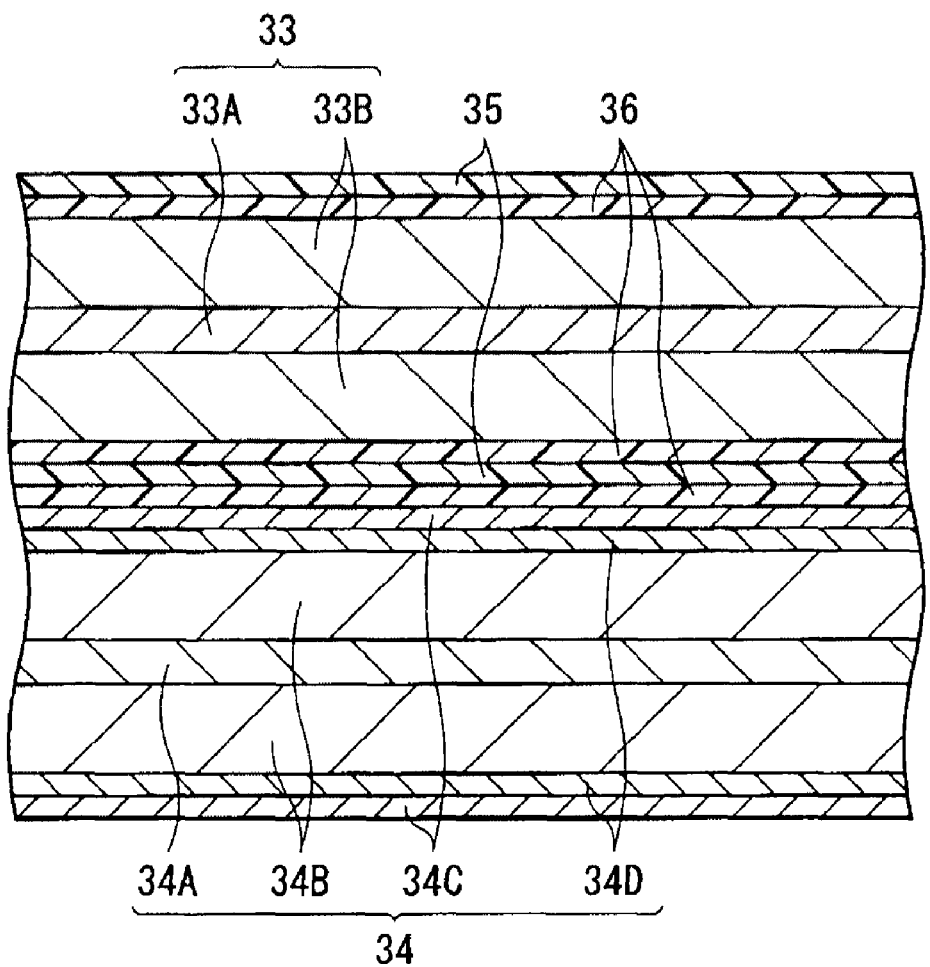
FIG. 10 is a cross section view showing a modification of the structure of the second secondary battery.

As shown in FIG. 10 corresponding to FIG. 9, the anode 34 may have a structure similar to that of the anode shown in FIG. 2. The anode 34 in this case further has an oxide coat 34D between the anode active material layer 34B and the coat 34C. The structure of the oxide coat 34D is similar to that of the foregoing oxide coat 4. In this case, the cycle characteristics are further improved as well.

Further, the anode 34 may have a structure similar to that of the anode as the second modification shown in FIG. 3. In this case, since the conductivity between the anode current collector 34A and the anode active material layer 34B is improved, the cycle characteristics are further improved.

Third Secondary Battery

Figure 11:
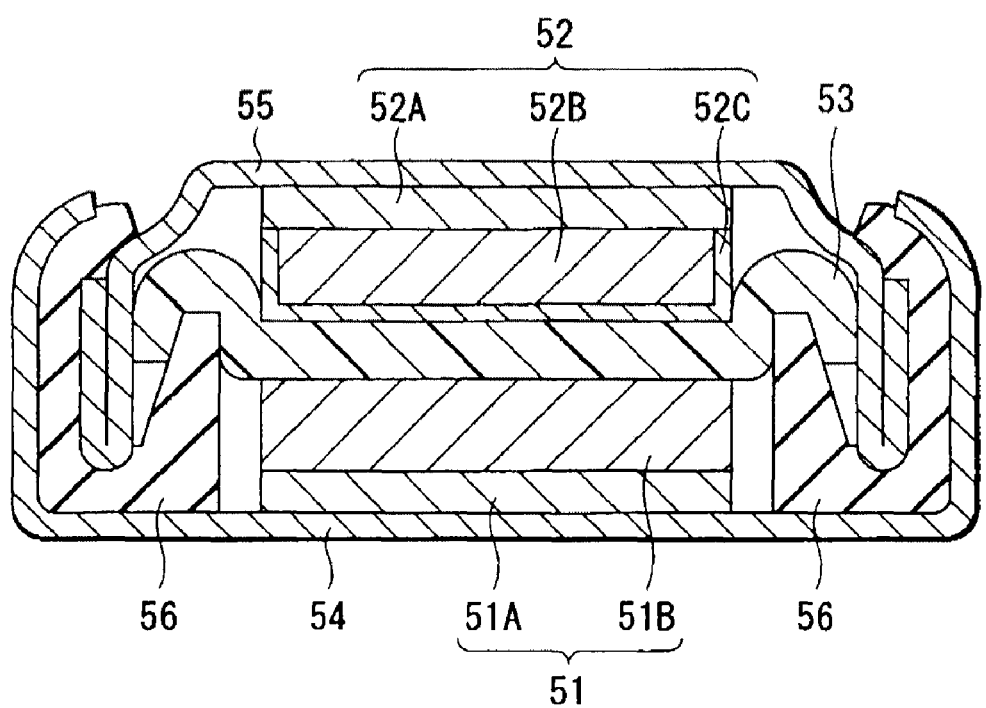
FIG. 11 is a cross section view showing a structure of a third secondary battery using the anode according to the embodiment of the invention.

FIG. 11 shows a cross sectional structure of a third secondary battery. In the third secondary battery, a cathode 51 is bonded to a package can 54 and an anode 52 is contained in a package cup 55, the resultant is layered with a separator 53 impregnated with an electrolytic solution in between, and then the resultant laminated body is caulked with a gasket 56. The battery structure using the package can 54 and the package cup 55 is so-called coin type.

The cathode 51 has, for example, a structure in which a cathode active material layer 51B is provided on one face of a cathode current collector 51A. The anode 52 has, for example, a structure in which an anode active material layer 52B and a coat 52C are provided on one face of an anode current collector 52A. Structures of the cathode current collector 51A, the cathode active material layer 51B, the anode current collector 52A, the anode active material layer 52B, the coat 52C, and the separator 53 are respectively similar to those of the cathode current collector 21A, the cathode active material layer 21B, the anode current collector 22A, the anode active material layer 22B, the coat 22C, and the separator 23 described above.

In the third secondary battery, as in the foregoing first secondary battery, lithium ions are inserted and extracted between the cathode 51 and the anode 52. That is, when charged, for example, lithium ions are extracted from the cathode 51 and inserted in the anode 52 through the electrolytic solution. Meanwhile, when discharged, lithium ions are extracted from the anode 52, and inserted in the cathode 51 through the electrolytic solution.

Actions and effects of the third secondary battery and the method of manufacturing the secondary battery are similar to those of the foregoing first secondary battery.

Figure 12:
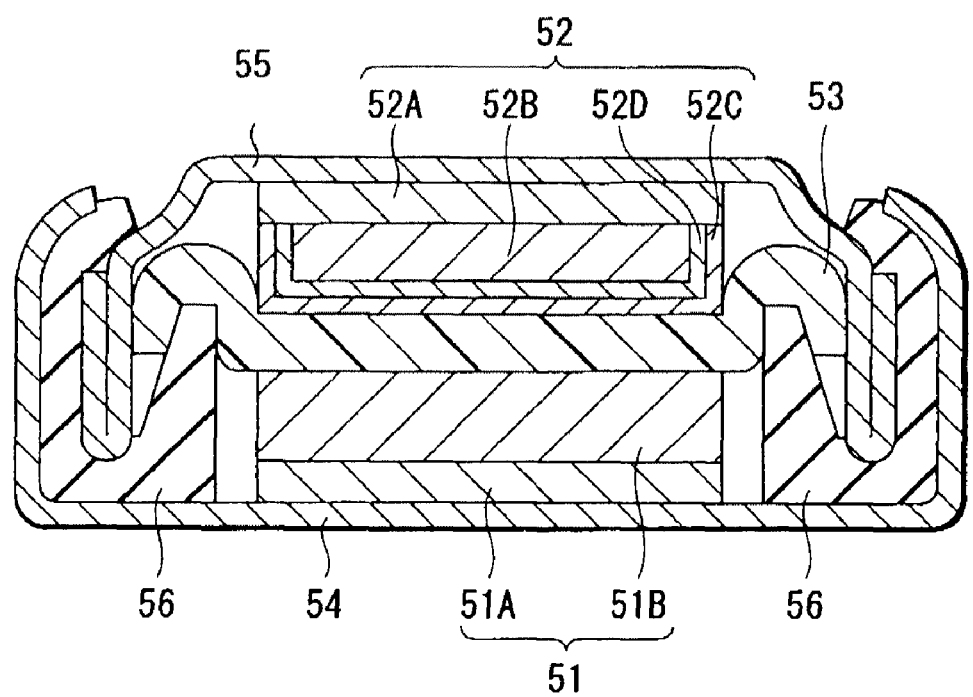
FIG. 12 is a cross section view showing a modification of the structure of the third secondary battery.

As shown in FIG. 12 corresponding to FIG. 11, the anode 52 may have a structure similar to that of the anode shown in FIG. 2. The anode 52 in this case further has an oxide coat 52D between the anode active material layer 52B and the coat 52C. The structure of the oxide coat 52D is similar to that of the foregoing oxide coat 4. In this case, the cycle characteristics are further improved as well.

Further, the anode 52 may have a structure similar to that of the anode as the second modification shown in FIG. 3. In this case, since the conductivity between the anode current collector 52A and the anode active material layer 52B is improved, the cycle characteristics are further improved.

EXAMPLES

Specific examples of the invention will be described in detail.

Examples 1-1 to 1-12

The laminated film secondary batteries shown in FIG. 7 and FIG. 8 were fabricated by using silicon as an anode active material.

First, the cathode 33 was formed. Lithium carbonate ($Li_2CO_3$) and cobalt carbonate ($CoCO_3$) were mixed at a molar ratio of 0.5:1. After that, the mixture was fired in the air at 900 deg C. for 5 hours to obtain lithium cobalt complex oxide ($LiCoO_2$). Next, 91 parts by weight of the lithium cobalt complex oxide as a cathode active material, 6 parts by weight of graphite as an electrical conductor, and 3 parts by weight of polyvinylidene fluoride as a binder were mixed to obtain a cathode mixture. After that, the cathode mixture was dispersed in N-methyl-2-pyrrolidone to obtain paste cathode mixture slurry. Subsequently, the cathode current collector 33A made of an aluminum foil (12 μm thick) was coated with the cathode mixture slurry, which was dried. After that, the resultant was compression-molded by a roll pressing machine to form the cathode active material layer 33B. After that, the cathode lead 31 made of aluminum was attached by being welded to an end of the cathode current collector 33A.

Subsequently, the anode 34 was formed. Silicon was evaporated on the both faces of the anode current collector 34A made of a copper foil (10 μm thick) by electron beam evaporation method. After that, the coat 34C was formed to cover the anode active material layer 34B.

When the coat 34C was formed, first, each 3 wt % aqueous solution as a solution containing each polymer lithium salt shown in Table 1 was respectively prepared.

Specifically, in Example 1-1, polyacrylic acid having an average molecular weight of 25000 (made by Wako Pure Chemical Industries. Ltd.) was dissolved in a given amount of water. After that, the resultant was reacted with equivalent lithium carbonate, and thereby 3 wt % aqueous solution of lithium polyacrylate was prepared. After part of the prepared aqueous solution was dried, the IR spectrum thereof was measured. In the result, the peak of a carboxyl group shown in 1700 $cm^{-1}$ for polyacrylic acid was shifted to 1540 $cm^{-1}$, and thus it was confirmed that a lithium salt was obtained. In a similar fashion, in Example 1-2, 3 wt % aqueous solution of lithium polymethacrylate was prepared by using polyacrylic acid having an average molecular weight of 100000 (made by Wako Pure Chemical Industries. Ltd.). In Example 1-3, 3 wt % aqueous solution of dilithium polymaleate was prepared by using polymaleic anhydride aqueous solution having an average molecular weight of 25000 (made by Polysciences, Inc.). In Example 1-4, 3 wt % aqueous solution of poly (ethylene-alt-dilithium maleate) copolymer (made by Aldrich Corp.) was formed by using poly (ethylene-alt-maleic anhydride) (made by Aldrich Corp.) having an average molecular weight of 100000 to 500000. In Example 1-5, 3 wt % aqueous solution of poly (styrene-dilithium maleate) copolymer was prepared by using poly (styrene-co-maleic acid) (made by Aldrich Corp.) having an average molecular weight of 50000. In Example 1-6, 3 wt % aqueous solution of poly (methylvinyl ether-alt-dilithium maleate) copolymer was prepared by using poly (methylvinyl ether-alt-maleic anhydride) (made by Aldrich Corp.) having an average molecular weight of 80000.

Further, in Example 1-7, 3 wt % aqueous solution of poly (ethylene-co-lithium methacrylate) copolymer was formed by preparing poly (ethylene-co-lithium methacrylate) copolymer having an average molecular weight of 75000 and a lithium methacrylate content ratio of 50 wt % and dissolving the prepared copolymer in a given amount of water. In a similar fashion, in Example 1-9, 3 wt % aqueous solution of lithium polystyrenesulfonate was formed by dissolving lithium polystyrenesulfonate having an average molecular weight of 75000 (made by Aldrich Corp.) in a given amount of water.

Further, in Example 1-8, 3 wt % aqueous solution of lithium polyvinylsulfonate having an average molecular weight of 75000 was prepared by obtaining polyvinyl sulfonate from sodium polyvinylsulfonate (made by Aldrich Corp.) with the use of hydrochloric acid, dissolving the prepared polyvinyl sulfonate in a given amount of water, and reacting the resultant with equivalent lithium carbonate. In a similar fashion, in Example 1-11, 3 wt % aqueous solution of poly (lithium styrenesulfonate-co-dilithium maleate) having an average molecular weight of 20000 was prepared by obtaining poly (styrenesulfonate-co-maleic acid) from poly (sodium styrenesulfonate-co-sodium maleate) (made by Aldrich Corp.) with the use of hydrochloric acid, dissolving prepared poly (styrenesulfonate-co-maleic acid) in a given amount of water, and then reacting the resultant with equivalent lithium carbonate.

Further, in Example 1-10, 3 wt % aqueous solution of dilithium polyvinylphosphonate was prepared by using polyvinyl phosphonate having an average molecular weight of 24000 (made by Polysciences, Inc.).

Further, in Example 1-12, aqueous solution obtained by mixing 3 wt % aqueous solution of lithium polyacrylate having an average molecular weight of 25000 obtained in the same manner as in Example 1-1 and 3 wt % aqueous solution of lithium polyvinylsulfonate having an average molecular weight of 75000 obtained in the same manner as in Example 1-8 was prepared.

After each aqueous solution containing each polymer lithium salt was formed, the anode current collector 34A provided with the anode active material layer 34B was soaked into each aqueous solution for several seconds, and then taken out and dried at 60 deg C. under reduced pressure to obtain the coat 34C. After that, the anode lead 32 made of nickel was welded to one end of the anode current collector 34A.

The coats 34C in Examples 1-1 to 1-12 were analyzed by ToF-SIMS. Each peak originated in the molecular weight of each repeating unit composing each polymer lithium salt shown in Table 1 (described later) was detected. Thus, it was confirmed that each coat 34C contained each polymer lithium salt. For example, in Example 1-1, positive secondary ion peak $C_3H_3O_2Li_2$ originated in lithium acrylate as a repeating unit was detected, and thus it was confirmed that the coat 34C contained lithium polyacrylate. It is possible to confirm existence of each polymer lithium salt by detecting IR spectrum from the coat 34C or analyzing the coat extracted from the coat 34C with the use of a solvent by NMR.

Subsequently, the cathode 33, the separator 35 made of a microporous polypropylene film (25 μm thick), and the anode 34 were layered in this order. The resultant laminated body was spirally wound many times in the longitudinal direction, and then the end thereof was fixed by the protective tape 37 made of an adhesive tape, and thereby a spirally wound body as a precursor of the spirally wound electrode body 30 was formed. Subsequently, the spirally wound body was sandwiched between the package members 40 made of a three-layer laminated film (total thickness: 100 μm) in which nylon being 30 μm thick, an aluminum foil being 40 μm thick, and cast polypropylene being 30 μm thick were layered from the outside. After that, outer edges other than an edge of one side of the package members were thermally fusion-bonded to each other. Thereby, the spirally wound body was contained in the pouch-like package members 40. Subsequently, an electrolytic solution was injected through the opening of the package member 40, the electrolytic solution as the electrolyte 36 was impregnated in the separator 35, and thereby the spirally wound electrode body 30 was formed.

As the electrolytic solution, a mixed solvent of ethylene carbonate (EC) and diethyl carbonate (DEC) as a solvent was used, and lithium hexafluorophosphate ($LiPF_6$) was used as an electrolyte salt. The composition of the mixed solvent (EC:DEC) was 30:70 at a weight ratio. The concentration of lithium hexafluorophosphate in the electrolytic solution was 1 mol/kg.

Finally, the opening of the package member 40 was thermally fusion bonded and sealed in the vacuum atmosphere. Thereby, the laminated film secondary battery was fabricated. For the secondary battery, by adjusting the thickness of the cathode active material layer 33B so that the charge and discharge capacity of the anode 34 was larger than the charge and discharge capacity of the cathode 33, lithium metal was prevented from being precipitated on the anode 34 when fully charged.

Comparative Example 1-1

A secondary battery was fabricated in the same manner as that of Examples 1-1 to 1-12, except that the coat 34C was not formed.

Comparative Example 1-2

A secondary battery was fabricated in the same manner as that of Example 1-1, except that the coat 34C made of lithium acrylate was formed.

Comparative Example 1-3

A secondary battery was fabricated in the same manner as that of Example 1-1, except that the coat 34C made of dilithium maleate was formed.

Comparative Example 1-4

A secondary battery was fabricated in the same manner as that of Example 1-1, except that the coat 34C made of lithium styrenesulfonate was formed.

Comparative Example 1-5

A secondary battery was fabricated in the same manner as that of Example 1-1, except that the coat 34C made of dilithium sulfopropionate was formed.

Comparative Example 1-6

A secondary battery was fabricated in the same manner as that of Example 1-1, except that the coat 34C made of dilithium vinylphosphonate was formed.

Comparative Example 1-7

A secondary battery was fabricated in the same manner as that of Example 1-1, except that the coat 34C made of sodium polyacrylate was formed. Aqueous solution of sodium polyacrylate having an average molecular weight of 250000 to 700000 was used.

Comparative Example 1-8

A secondary battery was fabricated in the same manner as that of Example 1-8, except that the coat 34C made of sodium polyvinylsulfonate was formed. 3 wt % aqueous solution obtained by dissolving sodium polyvinylsulfonate having an average molecular weight of 75000 in a given amount of water was used.

Comparative Example 1-9

A secondary battery was fabricated in the same manner as that of Example 1-1, except that the coat 34C made of disodium polyvinylphosphonate was formed. 3 wt % aqueous solution obtained by dissolving disodium polyvinylphosphonate having an average molecular weight of 24000 in a given amount of water was used.

Comparative Example 1-10

A secondary battery was fabricated in the same manner as that of Example 1-10, except that the coat 34C made of poly (sodium styrenesulfonate-disodium maleate) copolymer was formed. 3 wt % aqueous solution obtained by dissolving poly (sodium styrenesulfonate-sodium maleate) having an average molecular weight of 20000 in a given amount of water was used.

When a cycle test was performed for the secondary batteries of Examples 1-1 to 1-12 and Comparative examples 1-1 to 1-10 and the discharge capacity retention ratio was examined, the results shown in Table 1 and Table 2 were obtained.

In the cycle test, each secondary battery was repeatedly charged and discharged, and the discharge capacity retention ratio was obtained by the following procedure. First, charge and discharge were performed 2 cycles in the atmosphere at 23 deg C. to measure the discharge capacity at the second cycle. Subsequently, charge and discharge were continuously performed in the same atmosphere until the total number of cycles became 100 cycles to measure the discharge capacity at the 100th cycle. Finally, the discharge capacity retention ratio (%)=(discharge capacity at the 100th cycle/discharge capacity at the second cycle)×100 was calculated. As charge and discharge conditions of 1 cycle, charge was performed at the constant current density of mA/cm$^2$ until the battery voltage reached 4.2 V, charge was continuously performed at the constant voltage of 4.2 V until the current density reached 0.02 mA/cm$^2$. After that, discharge was performed at the constant current density of 1 mA/cm$^2$ until the battery voltage reached 2.5 V.

The foregoing procedure and the foregoing conditions of the cycle test were similarly applied to the following examples and comparative examples.

TABLE 1

Battery shape: laminated film type
Anode active material: silicon (electron beam evaporation method)
Electrolyte salt: LiPF$_6$ (1 mol/kg)

| Anode | Electrolytic solution solvent (wt %) | | Discharge capacity retention ratio |
|---|---|---|---|
| Coat | EC | DEC | (%) |
| Example 1-1 | Lithium polyacrylate | 30 | 70 | 68 |
| Example 1-2 | Lithium polymethacrylate | | | 65 |
| Example 1-3 | Dilithium polymaleate | | | 64 |
| Example 1-4 | Poly (ethylene-dilithium maleate) copolymer | | | 66 |
| Example 1-5 | Poly (styrene-dilithium maleate) copolymer | | | 63 |
| Example 1-6 | Poly (methylvinylether-dilithium maleate) copolymer | | | 64 |
| Example 1-7 | Poly (ethylene-lithium methacrylate) copolymer | | | 66 |
| Example 1-8 | Lithium polyvinylsulfonate | | | 62 |
| Example 1-9 | Lithium polystyrenesulfonate | | | 59 |
| Example 1-10 | Dilithium polyvinylphosphonate | | | 64 |
| Example 1-11 | Poly (lithium styrenesulfonate-dilithium maleate) copolymer | | | 69 |
| Example 1-12 | Lithium polyacrylate + lithium polyvinylsulfonate | | | 71 |

TABLE 2

Battery shape: laminated film type
Anode active material: silicon (electron beam evaporation method)
Electrolyte salt: LiPF$_6$ (1 mol/kg)

| Anode | Electrolytic solution solvent (wt %) | | Discharge capacity retention ratio |
|---|---|---|---|
| Coat | EC | DEC | (%) |
| Comparative example 1-1 | — | 30 | 70 | 30 |
| Comparative example 1-2 | Lithium acrylate | | | 30 |
| Comparative example 1-3 | Dilithium maleate | | | 32 |
| Comparative example 1-4 | Lithium styrenesulfonate | | | 32 |
| Comparative example 1-5 | Dilithium sulfopropionate | | | 58 |
| Comparative example 1-6 | Dilithium vinylphosphonate | | | 31 |
| Comparative example 1-7 | Sodium polyacrylate | | | 43 |
| Comparative example 1-8 | Sodium polyvinylsulfonate | | | 41 |
| Comparative example 1-9 | Disodium polyvinylphosphonate | | | 40 |
| Comparative example 1-10 | Poly (sodium styrenesulfonate-disodium maleate) copolymer | | | 46 |

As shown in Table 1 and Table 2, in Examples 1-1 to 1-12 in which the coat 34C was formed, the discharge capacity retention ratio was larger than that of Comparative example 1-1 in which the coat 34C was not formed. Further, in Examples 1-1 to 1-12, since the coat 34C contained the ionic polymer containing lithium, a high discharge capacity retention ratio was obtained compared to in Comparative examples 1-2 to 1-6 in which the coat 34C did not contain a polymer but was made of the monomer. Further, comparing Examples 1-1, 1-8, 1-10, and 1-11 with Comparative examples 1-7 to 1-10, it was found that a higher discharge capacity retention ratio was obtained with the use of the lithium salt than with the use of sodium salt. Further, comparing Examples 1-1 to 1-7 and 1-10 with Examples 1-8 and 1-9, it was found that a higher discharge capacity retention ratio was obtained in the case where the coat 34C contained the carboxylate polymer or phosphonate polymer than the case where the coat 34C contained the sulfonate polymer. Further, when the ionic polymer composing the coat 34C contained the copolymer of carboxylate and sulfonate (Example 1-11), or when the ionic polymer composing the coat 34C contained the mixture of the carboxylate copolymer and the sulfonate copolymer (Example 1-12), the higher discharge capacity retention ratio was obtained. For a secondary battery having a structure similar to that of these examples (Examples 1-1 to 1-12) except that a sodium salt was used as an electrolyte salt, the discharge capacity retention ratio was examined. In the result, the discharge capacity retention ratio was higher in those examples using the lithium salt (LiPF$_6$) as an electrolyte salt. Accordingly, it was confirmed that when the electrode reactant was lithium ion, higher cycle characteristics were obtained.

Example 2-1

A secondary battery was fabricated in the same manner as that of Example 1-1, except that propylene carbonate (PC) was added as a solvent, and the composition of the mixed solvent was changed. The composition of the mixed solvent was EC:PC:DEC=10:20:70 at a weight ratio.

Example 2-2

A secondary battery was fabricated in the same manner as that of Example 1-1, except that 4-fluoro-1,3-dioxolane-2- one (FEC) was used instead of EC. The composition of the mixed solvent was DEC:FEC=70:30 at a weight ratio.

Example 2-3

A secondary battery was fabricated in the same manner as that of Example 1-1, except that PC and FEC were added as a solvent, and the composition of the mixed solvent was changed. The composition of the mixed solvent was EC:PC:DEC:FEC=10:10:70:10 at a weight ratio.

Example 2-4

A secondary battery was fabricated in the same manner as that of Example 1-1, except that 4,5-difluoro-1,3-dioxolane-2-one (DFEC) was added as a solvent, and the composition of the mixed solvent was changed. The composition of the mixed solvent was EC:DEC:DFEC=10:70:20 at a weight ratio.

Example 2-5

A secondary battery was fabricated in the same manner as that of Example 1-1, except that PC and DFEC were added as a solvent, and the composition of the mixed solvent was changed. The composition of the mixed solvent was EC:PC:DEC:DFEC=10:10:70:10 at a weight ratio.

Example 2-6

A secondary battery was fabricated in the same manner as that of Example 1-1, except that vinylene carbonate (VC) was added as a solvent, and the composition of the mixed solvent was changed. The composition of the mixed solvent was EC:DEC:VC=25:70:5 at a weight ratio.

Example 2-7

A secondary battery was fabricated in the same manner as that of Example 2-2, except that bis carbonate (fluoromethyl) (DFDMC) was added as a solvent, and the composition of the mixed solvent was changed. The composition of the mixed solvent was DEC:FEC:DFDMC=65:30:5 at a weight ratio.

Comparative Example 2-1

A secondary battery was fabricated in the same manner as that of Example 2-2, except that the coat 34C was not formed.

Comparative Example 2-2

A secondary battery was fabricated in the same manner as that of Example 2-4, except that the coat 34C was not formed.

Comparative Example 2-3

A secondary battery was fabricated in the same manner as that of Example 2-6, except that the coat 34C was not formed.

When the cycle test was performed for the secondary batteries of Examples 2-1 to 2-7 and Comparative examples 2-1 to 2-3 and the discharge capacity retention ratio was examined, the results shown in Table 3 were obtained. In Table 3, data for Example 1-1 and Comparative example 1-1 was also shown.

TABLE 3

Battery shape: laminated film type
Anode active material: silicon (electron beam evaporation method)
Electrolyte salt: LiPF$_6$ (1 mol/kg)

| | Anode Coat | Solvent of electrolytic solution (wt %) | | | | | | | Discharge capacity retention ratio (%) |
|---|---|---|---|---|---|---|---|---|---|
| | | EC | PC | DEC | FEC | DFEC | VC | DFDMC | |
| Example 1-1 | Lithium polyacrylate | 30 | — | 70 | — | — | — | — | 68 |
| Example 2-1 | | 10 | 20 | 70 | — | — | — | — | 64 |
| Example 2-2 | | — | — | 70 | 30 | — | — | — | 83 |
| Example 2-3 | | 10 | 10 | 70 | 10 | — | — | — | 76 |
| Example 2-4 | | 10 | — | 70 | — | 20 | — | — | 84 |
| Example 2-5 | | 10 | 10 | 70 | — | 10 | — | — | 82 |
| Example 2-6 | | 25 | — | 70 | — | — | 5 | — | 73 |
| Example 2-7 | | — | — | 65 | 30 | — | — | 5 | 83 |
| Comparative example 1-1 | — | 30 | — | 70 | — | — | — | — | 30 |
| Comparative example 2-1 | — | — | — | 70 | 30 | — | — | — | 68 |
| Comparative example 2-2 | — | 10 | — | 70 | — | 20 | — | — | 69 |
| Comparative example 2-3 | — | 25 | — | 70 | — | — | 5 | — | 43 |

As shown in Table 3, in Examples 2-2 to 2-7 in which FEC, DFEC, VC, or DFDMC was added, the discharge capacity retention ratio tended to be higher than that of Examples 1-1 and 2-1 in which FEC, DFEC, VC, or DFDMC was not added. Accordingly, it was confirmed that for improving the cycle characteristics, it was particularly advantageous that the electrolytic solution contained the cyclic ester carbonate having halogen or the chain ester carbonate having halogen as a solvent.

Further, based on comparison between Example 2-2 and Comparative example 2-1, between Example 2-4 and Comparative example 2-2, and between Example 2-6 and Comparative example 2-3, it was confirmed that when the composition of the solvent of the electrolytic solution was identical, the higher discharge capacity retention ratio was obtained by forming the coat 34C.

Examples 3-1 to 3-3

Secondary batteries were fabricated in the same manner as that of Example 2-2, except that propene sultone as sultone (PRS: Example 3-1), succinic anhydride as an acid anhydride (SCAH: Example 3-2), or anhydrous sulfobenzoic acid as an acid anhydride (SBAH: Example 3-3) was added as a solvent. Then, the additive amount was 1 wt % to 100 wt % solvent of the electrolytic solution.

When the cycle test was performed for the secondary batteries of Examples 3-1 to 3-3 and the discharge capacity retention ratio was examined, the results shown in Table 4 were obtained. In Table 4, data for Example 2-2 was also shown.

TABLE 4

Battery shape: laminated film type
Anode active material: silicon (electron beam evaporation method)
Electrolyte salt: $LiPF_6$ (1 mol/kg)

| Anode | Solvent of electrolytic solution (wt %) | | | Discharge capacity retention ratio |
|---|---|---|---|---|
| Coat | DEC | FEC | Others | (%) |
| Example 2-2 Lithium | 70 | 30 | — | 83 |
| Example 3-1 polyacrylate | | | PRS (1 wt %) | 81 |
| Example 3-2 | | | SCAH (1 wt %) | 84 |
| Example 3-3 | | | SBAH (1 wt %) | 83 |

As shown in Table 4, in Examples 3-1 to 3-3 in which PRS, SCAH, or SBAH was added as a solvent, the discharge capacity retention ratio almost equal to that of Example 2-2 in which PRS, SCAH, or SBAH was not added was obtained.

Examples 4-1 to 4-4

Secondary batteries were fabricated in the same manner as that of Example 2-2, except that lithium tetrafluoroborate ($LiBF_4$: Example 4-1), the compound shown in Chemical formula 9(6) (Example 4-2), the compound shown in Chemical formula 10(2) (Example 4-3), or the compound shown in Chemical formula 14(2) (Example 4-4) was added as an electrolyte salt. Then, the concentration of lithium hexafluorophosphate in the electrolytic solution was 0.9 mol/kg and the concentration of the added compound was 0.1 mol/kg.

When the cycle test was performed for the secondary batteries of Examples 4-1 to 4-4 and the discharge capacity retention ratio was examined, the results shown in Table 5 were obtained. In Table 5, data for Example 2-2 was also shown.

TABLE 5

Battery shape: laminated film type
Anode active material: silicon (electron beam evaporation method)
Coat of anode: lithium polyacrylate

| | Electrolytic solution | | | Discharge capacity retention ratio (%) |
|---|---|---|---|---|
| | Electrolyte salt | Solvent (wt %) | | |
| | | DEC | FEC | |
| Example 2-2 | $LiPF_6$ 1 mol/kg | 70 | 30 | 83 |
| Example 4-1 | $LiPF_6$ 0.9 mol/kg $LiBF_4$ 0.1 mol/kg | | | 82 |
| Example 4-2 | Chemical formula 9(6) 0.1 mol/kg | | | 82 |
| Example 4-3 | Chemical formula 10(2) 0.1 mol/kg | | | 83 |
| Example 4-4 | Chemical formula 14(2) 0.1 mol/kg | | | 81 |

As shown in Table 5, in Examples 4-1 to 4-4 in which a given compound or the like was added together with lithium hexafluorophosphate as an electrolyte salt, the discharge capacity retention ratio almost equal to that of Example 2-2 was obtained. Accordingly, it was confirmed that when the electrolytic solution contained lithium tetrafluoroborate, the compound shown in Chemical formula 6, the compound shown in Chemical formula 7, or the compound shown in Chemical formula 12 as an electrolyte salt, favorable cycle characteristics were obtained as well.

For a case where the electrolytic solution contains lithium perchlorate, lithium hexafluoroarsenate, the compound shown in Chemical formula 8, the compound shown in Chemical formula 11, or the compound shown in Chemical formula 13 as an electrolyte salt, the discharge capacity retention ratio was not herein shown. However, in this case, when the discharge capacity retention ratio was examined, it was confirmed that the cycle characteristics tended to be improved as well.

Examples 5-1 to 5-3

Secondary batteries were fabricated in the same manner as that of Example 1-1, except that the average molecular weight of lithium polyacrylate composing the coat 34C was changed.

When the cycle test was performed for the secondary batteries of Examples 5-1 to 5-3 and the discharge capacity retention ratio was examined, the results shown in Table 6 were obtained. In Table 6, data for Example 1-1 was also shown.

TABLE 6

Battery shape: laminated film type
Anode active material: silicon (electron beam evaporation method)
Coat of anode: lithium polyacrylate

| | Coat Average molecular weight | Electrolytic solution Solvent (wt %) | | Discharge capacity retention ratio (%) |
|---|---|---|---|---|
| | | EC | DEC | |
| Example 1-1 | 25,000 | 30 | 70 | 68 |
| Example 5-1 | 5,000 | | | 69 |

TABLE 6-continued

Battery shape: laminated film type
Anode active material: silicon (electron beam evaporation method)
Coat of anode: lithium polyacrylate

| | Coat Average molecular weight | Electrolytic solution Solvent (wt %) | | Discharge capacity retention ratio (%) |
|---|---|---|---|---|
| | | EC | DEC | |
| Example 5-2 | 250,000 | | | 68 |
| Example 5-3 | 1,000,000 | | | 68 |
| Comparative example 1-1 | — | 30 | 70 | 30 |

As shown in Table 6, it was confirmed that the almost constant discharge capacity retention ratio was obtained irrespective of the average molecular weight.

Example 6-1

A secondary battery was fabricated in the same manner as that of Example 2-2, except that the oxide coat 34D was formed between the anode active material layer 34B and the coat 34C. The oxide coat 34D was formed as follows. A solution was prepared by dissolving boric acid as an anion capture agent into hydrofluosilic acid. Subsequently, the anode current collector 34A provided with the anode active material layer 34B was soaked into the solution for 3 hours to precipitate silicon oxide ($SiO_2$) on the surface of the anode active material layer 34B. After that, the resultant was washed with water and then dried under the reduced pressure.

Example 6-2

A secondary battery was fabricated in the same manner as that of Example 2-2, except that cobalt plating was fixed to the surface of the coat 34C or the like. The coat 34C was formed as in Example 2-2. After that, while air was supplied to the plating bath, cobalt was deposited on the both faces of the anode current collector 34A to form a metal by electrolytic plating method. Thereby, the anode active material layer 34B was formed. As a plating solution, a cobalt plating solution, made by Japan Pure Chemical Co., Ltd. was used. The current density was from 2 A/dm$^2$ to 5 A/dm$^2$, and the plating rate was 10 nm/sec.

Example 6-3

A secondary battery was fabricated in the same manner as that of Example 6-1, except that after the oxide coat 34D was formed, cobalt plating was fixed to the surface thereof or the like. The oxide coat 34D was formed as in Example 6-1. After that, while air was supplied to the plating bath, cobalt was deposited on the both faces of the anode current collector 34A to form a metal by electrolytic plating method. Thereby, the anode active material layer 34B was formed. As a plating solution, a cobalt plating solution, made by Japan Pure Chemical Co., Ltd. was used. The current density was in the range from 2 A/dm$^2$ to 5 A/dm$^2$, and the plating rate was 10 nm/sec.

Comparative Examples 6-1 to 6-3

Secondary batteries were fabricated in the same manner as that of Examples 6-1 to 6-3, except that the coat 34C was not formed.

When the cycle test was performed for the secondary batteries of Examples 6-1 to 6-3 and Comparative examples 6-1 to 6-3 and the discharge capacity retention ratio was examined, the results shown in Table 7 were obtained. In Table 7, data for Example 2-2 was also shown.

TABLE 7

Battery shape: laminated film type
Anode active material: silicon (electron beam evaporation method)
Electrolyte salt: $LiPF_6$ (1 mol/kg)

| | Anode | | | Solvent of electrolytic solution (wt %) | | Discharge capacity retention ratio (%) |
|---|---|---|---|---|---|---|
| | Coat | Oxide coat | Others | DEC | FEC | |
| Example 2-2 | Lithium polyacrylate | — | — | 70 | 30 | 83 |
| Example 6-1 | | $SiO_2$ | — | | | 92 |
| Example 6-2 | | — | Co plating | | | 94 |
| Example 6-3 | | $SiO_2$ | Co plating | | | 95 |
| Comparative example 6-1 | — | $SiO_2$ | — | 70 | 30 | 85 |
| Comparative example 6-2 | | — | Co plating | | | 83 |
| Comparative example 6-3 | | $SiO_2$ | Co plating | | | 90 |

As shown in Table 6, in Examples 6-1 to 6-3 in which at least one of $SiO_2$ and Co plating was provided in addition to the coat 34C made of lithium polyacrylate, the discharge capacity retention ratio was higher than that of Example 2-2 in which only the coat 34C made of lithium polyacrylate was provided. Further, based on comparison between Examples 6-1 to 6-3 and Comparative examples 6-1 to 6-3, it was confirmed that when the coat 34C was provided, the discharge capacity retention ratio was improved.

Example 7-1

A secondary battery was fabricated in the same manner as that of Example 1-1, except that the anode active material layer 34B was formed by sintering method instead of evaporation method. The anode active material layer 34B was formed as follows. First, 95 parts by weight of silicon powder having an average particle diameter of 1 μm as an anode active material and 5 parts by weight of polyimide as a binder were mixed to obtain an anode mixture. After that, the anode mixture was dispersed in N-methyl-2-pyrrolidone and thereby paste anode mixture slurry was obtained. After that, the anode current collector 34A made of a copper foil (being 18 μm thick) was uniformly coated with the anode mixture slurry, which was dried. After that, the resultant was pressurized and heated for 12 hours at 400 deg C. under the vacuum atmosphere.

Comparative Example 7-1

A secondary battery was fabricated in the same manner as that of Example 7-1, except that the coat 34C was not formed, and as the binder, polyimide was used instead of lithium polyacrylate.

Comparative Example 7-2

A secondary battery was fabricated in the same manner as that of Example 7-1, except that the coat 34C was not formed.

When the cycle characteristics were examined for the secondary batteries of Example 7-1 and Comparative examples 7-1 and 7-2, the results shown in Table 8 were obtained.

TABLE 8

Battery shape: laminated film type
Anode active material: silicon (sintering method)
Electrolyte salt: LiPF$_6$ (1 mol/kg)

| | Anode | | Solvent of electrolytic solution (wt %) | | Discharge capacity retention |
|---|---|---|---|---|---|
| | Coat | Binder | EC | DEC | ratio (%) |
| Example 7-1 | Lithium polyacrylate | — | 30 | 70 | 49 |
| Comparative example 7-1 | — | Lithium polyacrylate | 30 | 70 | 35 |
| Comparative example 7-2 | — | — | 30 | 70 | 29 |

As shown in Table 8, in Example 7-1 in which the coat 34C was formed, the discharge capacity retention ratio was higher than that of Comparative examples 7-1 and 7-2 in which the coat 34C was not formed. Accordingly, it was confirmed that the cycle characteristics were also improved by providing the coat 34C containing the ionic polymer having lithium even when the anode active material layer containing silicon as an anode active material was formed by sintering method.

In the foregoing respective examples, the description has been given of the laminated film type secondary battery. In addition, tendency similar to that of the laminated film type secondary battery was confirmed for the cylindrical type and the coin type secondary battery. That is, it was confirmed that the cycle characteristics were improved when the anode had the coat having the ionic polymer containing lithium irrespective of the method of forming the anode active material layer, the anode active material type, the battery structure and the like.

The invention has been described with reference to the embodiment and the examples. However, the invention is not limited to the aspects described in the foregoing embodiment and the foregoing examples, and various modifications may be made. For example, the anode of the invention is not necessarily used for the secondary battery, but may be used for an electrochemical device other than the secondary battery. As other application, for example, a capacitor or the like is cited.

Further, in the foregoing embodiment and the foregoing examples, the descriptions have been given of the case using the electrolytic solution or the gel electrolyte in which the electrolytic solution is held by the polymer compound as an electrolyte of the secondary battery of the invention. However, other type of electrolyte may be used. As other electrolyte, for example, a mixture obtained by mixing an ion conductive inorganic compound such as ion conductive ceramics, ion conductive glass, and ionic crystal and an electrolytic solution; a mixture obtained by mixing other inorganic compound and an electrolytic solution; a mixture of the foregoing inorganic compound and a gel electrolyte or the like is cited.

Further, in the foregoing embodiment and the foregoing examples, the descriptions have been given of the lithium ion secondary battery in which the anode capacity is expressed based on insertion and extraction of lithium as a secondary battery of the invention. However, the secondary battery of the invention is not limited thereto. The invention is similarly applicable to a secondary battery in which the anode capacity includes the capacity based on insertion and extraction of lithium and the capacity based on precipitation and dissolution of lithium, and the anode capacity is expressed as the sum of these capacities, by setting the charge capacity of the anode material capable of inserting and extracting lithium to a smaller value than the charge capacity of the cathode.

Further, in the foregoing embodiment and the foregoing examples, the description has been given mainly of the case using lithium as an electrode reactant. However, as an electrode reactant, other Group 1 element in the long periodic table such as sodium (Na) and potassium (K), a Group 2 element such as magnesium and calcium (Ca), or other light metal such as aluminum may be used. In these cases, the anode material described in the foregoing embodiment may be used as an anode active material as well.

Further, in the foregoing embodiment and the foregoing examples, for the secondary battery of the invention, the descriptions have been given with the specific examples of the secondary batteries having a battery structure of cylindrical type, laminated film type, and coin type, and with the specific example of the battery in which the battery element has the spirally wound structure. However, the invention is similarly applicable to a secondary battery having other structure such as a square type secondary battery and a button type secondary battery, or a secondary battery in which the battery element has other structure such as a lamination structure.

It should be understood by those skilled in the art that various modifications, combinations, sub-combinations and alternations may occur depending on design requirements and other factors insofar as they are within the scope of the appended claims or the equivalents thereof.

What is claimed is:
1. An anode, comprising:
an anode current collector;
an anode active material layer, on the anode current collector, comprising an anode active material comprising at least one of a simple substance of silicon, an alloy of silicon, a compound of silicon, a simple substance of tin, an alloy of tin, and a compound of tin; and
a coat, on the anode active material layer, consisting of at least one ionic polymer with at least a lithium counterion,
wherein the at least one ionic polymer is obtained by polymerizing at least one of an acrylate, a methacrylate, a 1,2-ethylene dicarboxylate, a vinyl sulfonate, a styrenesulfonate, and a vinylphosphonate.

2. The anode of claim 1, wherein the ionic polymer comprises a carboxylate ion group.

3. The anode of claim 1, wherein the ionic polymer is obtained by polymerizing at least one of lithium acrylate, lithium methacrylate, and dilithium maleate.

4. The anode of claim 1, wherein the anode active material layer is formed by vapor-phase deposition.

5. The anode of claim 1, wherein the anode active material layer comprises a plurality of anode active material particles, and comprises a metal comprising a metal element not being alloyed with an electrode reactant in a gap between the anode active material particles adjacent to each other.

6. The anode of claim 5, wherein the metal fills in the gap between the anode active material particles.

7. The anode of claim 5, wherein the metal element is at least one selected from the group consisting of iron (Fe), cobalt (Co), nickel (Ni), zinc (Zn), and copper (Cu).

8. The anode of claim 1, wherein an oxide coat, comprising an oxide of at least one selected from the group consisting of silicon, germanium, and tin, is provided between the anode active material layer and the coat.

9. The anode of claim 1, wherein the ionic polymer is a mixture of
at least one polymer comprising a carboxylate ion group and
at least one polymer comprising a sulfonate ion group.

10. The anode of claim 1, wherein the ionic polymer is a copolymer of a monomer comprising a carboxylate ion group and a monomer comprising a sulfonate ion group.

11. The anode of claim 1, wherein the anode active material layer further comprises a binder, and the binder consists essentially of at least one selected from the group consisting of a synthetic rubber, polyvinylidene fluoride, and a polyimide.

12. The anode of claim 1, wherein the ionic polymer comprises a sulfonate ion group.

13. A method of manufacturing an anode, the method comprising:
(a) forming an anode active material layer on an anode current collector; and, thereafter,
(c) forming a coat on the anode active material layer with a solution comprising at least one ionic polymer with at least a lithium counterion, thereby obtaining the coat consisting of the at least one ionic polymer with at least a lithium counterion on the anode,
wherein the at least one ionic polymer is obtained by polymerizing at least one of an acrylate, a methacrylate, a 1,2-ethylene dicarboxylate, a vinyl sulfonate, a styrenesulfonate, and a vinylphosphonate.

14. The method of claim 13, wherein the ionic polymer is produced by polymerizing at least one of lithium acrylate, lithium methacrylate, and dilithium maleate.

15. The method of claim 13, wherein the forming (c) comprises
soaking the anode active material layer in the solution or coating the anode active material layer with the solution.

16. The method of claim 13, wherein the forming (a) comprises vapor-phase depositing the anode active material layer on the anode current collector.

17. The method of claim 13, further comprising:
(b) forming an oxide coat on the anode active material layer,
wherein the forming (b) is carried out before the forming (c) of the coat.

18. A secondary battery, comprising:
(i) a cathode;
(ii) an anode; and
(iii) an electrolytic solution,
wherein the anode comprises
(ii-a) an anode current collector,
(ii-b) an anode active material layer, provided on the anode current collector, comprising an anode active material comprising at least one of a simple substance of silicon, an alloy of silicon, a compound of silicon, a simple substance of tin, an alloy of tin, and a compound of tin, and
(ii-c) a coat, provided on the anode active material layer, consisting of at least one ionic polymer with a lithium counterion,
wherein the ionic polymer is obtained by polymerizing at least one of an acrylate, a methacrylate, a 1,2-ethylene dicarboxylate, a vinyl sulfonate, a styrenesulfonate, and a vinylphosphonate.

19. The battery of claim 18, wherein the ionic polymer comprises a carboxylate ion group.

20. The battery of claim 18, wherein lithium is contained as an electrode reactant.

21. The battery of claim 18, wherein the ionic polymer is obtained by polymerizing at least one of lithium acrylate, lithium methacrylate, and dilithium maleate.

22. The battery of claim 18, wherein the anode active material layer is formed by vapor-phase deposition.

23. The battery of claim 18, wherein the anode active material layer comprises
a plurality of anode active material particles, and
a metal comprising a metal element not alloyed with an electrode reactant
in a gap between the anode active material particles adjacent to each other.

24. The battery of claim 23, wherein the metal fills in the gap between the anode active material particles.

25. The battery of claim 23, wherein the metal element is at least one selected from the group consisting of iron (Fe), cobalt (Co), nickel (Ni), zinc (Zn), and copper (Cu).

26. The battery of claim 18, wherein an oxide coat, comprising an oxide of at least one selected from the group consisting of silicon, germanium, and tin, is provided between the anode active material layer and the coat.

27. The battery of claim 18, wherein the ionic polymer is a mixture of
at least one polymer comprising a carboxylate ion group and
at least one polymer comprising a sulfonate ion group.

28. The battery of claim 18, wherein the ionic polymer is a copolymer of a monomer comprising a carboxylate ion group and a monomer comprising a sulfonate ion group.

29. The battery of claim 18, wherein the electrolytic solution comprises a solvent comprising a cyclic ester carbonate comprising an unsaturated bond.

30. The battery of claim 18, wherein the electrolytic solution comprises a solvent comprising at least one selected from the group consisting of a chain ester carbonate comprising a halogen of formula (1) and a cyclic ester carbonate comprising a halogen of formula (2):

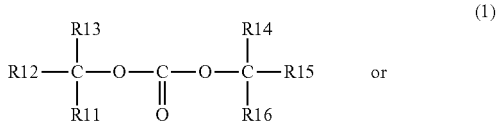

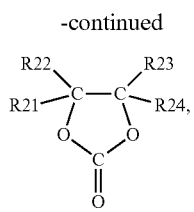

(2)

wherein R11 to R16 independently represent a hydrogen group, a halogen group, an alkyl group, or an alkyl halide group, and at least one of R11 to R16 is the halogen group or the alkyl halide group, and wherein R21 to R24 independently represent a hydrogen group, a halogen group, an alkyl group, or an alkyl halide group, and at least one of R21 to R24 is the halogen group or the alkyl halide group.

31. The battery of claim 30,
wherein the chain ester carbonate (1) is at least one selected from the group consisting of fluoromethyl methyl carbonate, bis(fluoromethyl) carbonate, and difluoromethyl methyl carbonate, and
wherein the cyclic ester carbonate (2) is at least one of 4-fluoro-1,3-dioxolane-2-one and 4,5-difluoro-1,3-dioxolane-2-one.

32. The battery of claim 18, wherein the electrolytic solution comprises a solvent comprising sultone.

33. The battery of claim 18, wherein the electrolytic solution comprises a solvent comprising an acid anhydride.

34. The battery of claim 18, wherein the electrolytic solution comprises an electrolyte salt comprising at least one compound having a formula selected from the group consisting of formula (3), formula (4), and formula (5):

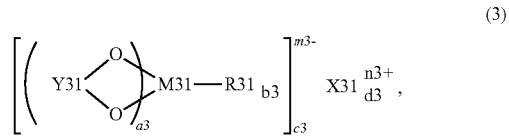

(3)

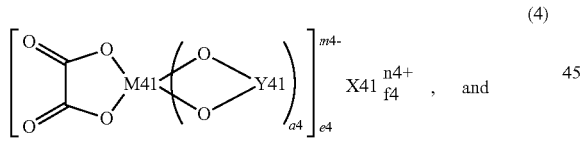

(4)

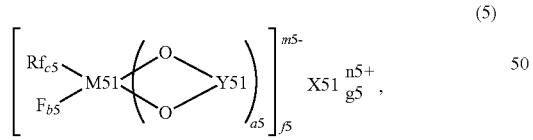

(5)

wherein
X31, X41, and X51 are a Group 1 element or a Group 2 element in the long period periodic table or aluminum,
M31, M41, and M51 are a transition metal element, a Group 13 element, a Group 14 element, or a Group 15 element in the long period periodic table,
R31 is a halogen group,
Y31 is —OC—R32-CO—, —OC—CR33$_2$-, or —OC—CO—,
Y41 is —OC—(CR41$_2$)$_{b4}$-CO—, —R43$_2$C—(CR42$_2$)$_{c4}$-CO—, —R43$_2$C—(CR42$_2$)$_{c4}$-CR43$_2$-, —R43$_2$C—(CR42$_2$)$_{c4}$-SO$_2$—, —O$_2$S—(CR42$_2$)$_{d4}$-SO$_2$—, or —OC—(CR42$_2$)$_{d4}$-SO$_2$—, Y51 is —OC—(CR51$_2$)$_{d5}$-CO—, —R52$_2$C—(CR51$_2$)$_{d5}$-CO—, —R52$_2$C—(CR51$_2$)$_{d5}$-CR52$_2$-, —R52$_2$C—(CR51$_2$)$_{d5}$-SO$_2$—, —O$_2$S—(CR51$_2$)$_{e5}$-SO$_2$—, or —OC—(CR51$_2$)$_{e5}$-SO$_2$—, Rf is a fluorinated alkyl group or a fluorinated aryl group, and has a carbon number in a range of from 1 to 10, R32 is an alkylene group, an alkylene halide group, an arylene group, or an arylene halide group, R33 is an alkyl group, an alkyl halide group, an aryl group, or an aryl halide group, R41, R42, R43, R51, and R52 are independently a hydrogen group, an alkyl group, a halogen group, or an alkyl halide group, with the caveat that at least one of R41 and R43 is the halogen group or the alkyl halide group, and with the caveat that at least one R52 is the halogen group or the alkyl halide group, a3, b4, d4, b5, c5, and e5 are independently 1, 2, 3, 4, and c4 and d5 are independently 0, 1, 2, 3 or 4, b3 is 0, 2, or 4, c3, d3, m3, n3, f4, m4, g5, and m5 are independently 1, 2, or 3, and a4, e4, n4, a5, f5, and n5 are independently 1 or 2.

35. The battery of claim 34, wherein the compound of formula (3) is at least one selected from the group consisting of

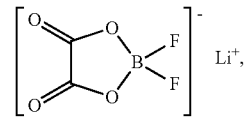

(3a)

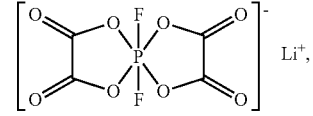

(3b)

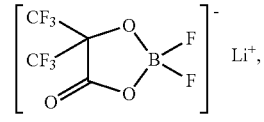

(3c)

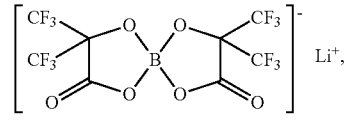

(3d)

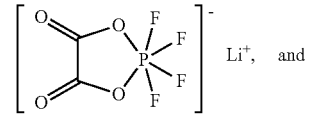

(3e)

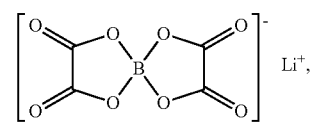

(3f)

the compound of formula (4) is at least one selected from the group consisting of -continued (4a) 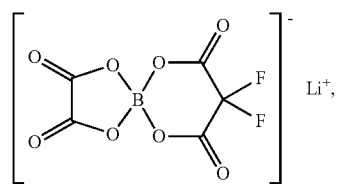

(4b) 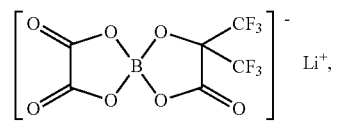

(4c) 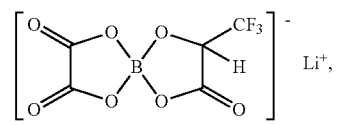

(4d) 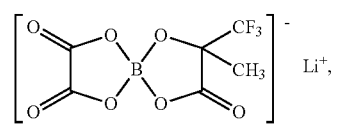

(4e) 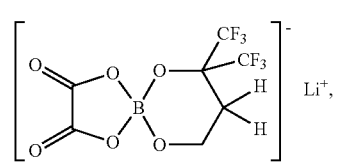

(4f) 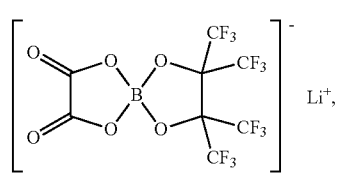

(4g) 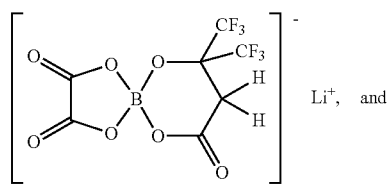

(4h) 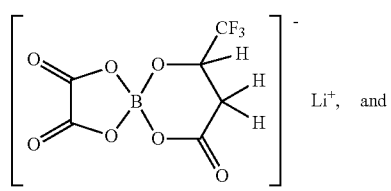

the compound of formula (5) is (5a) 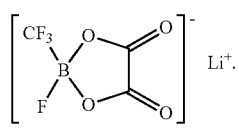

36. The battery of claim 18, wherein the electrolytic solution comprises an electrolyte salt comprising at least one selected from the group consisting of lithium hexafluorophosphate (LiPF$_6$), lithium tetrafluoroborate (LiBF$_4$), lithium perchlorate (LiClO$_4$), lithium hexafluoroarsenate (LiAsF$_6$), a compound of formula (8)

$$LiN(C_mF_{2m+1}SO_2)(C_nF_{2n+1}SO_2) \tag{8},$$

wherein m and n are independently an integer of 1 or more, a compound of formula (9)

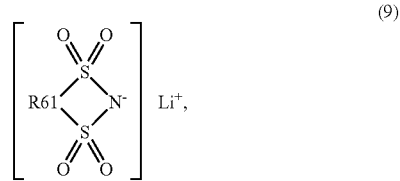  (9)

wherein R61 is a straight chain or branched perfluoro alkylene group, and has a carbon number in a range of from 2 to 4, and a compound of formula (10)

$$LiC(C_pF_{2p+1}SO_2)(C_qF_{2q+1}SO_2)(C_rF_{2r+1}SO_2) \tag{10},$$

wherein p, q, and r are independently an integer of 1 or more.

37. A method of manufacturing a secondary battery, the method comprising:
(a) forming an anode active material layer on an anode current collector; and then
(c) forming a coat on the anode active material layer with a solution comprising at least one ionic polymer with at least a lithium counterion in forming an anode, thereby obtaining the coat consisting of the at least one ionic polymer with at least the lithium counterion on the anode,
wherein the secondary battery comprises a cathode, the anode, and an electrolytic solution, and
wherein the at least one ionic polymer is obtained by polymerizing at least one of an acrylate, a methacrylate, a 1,2-ethylene dicarboxylate, a vinyl sulfonate, a styrenesulfonate, and a vinylphosphonate.

38. The method of claim 37, wherein the ionic polymer is produced by polymerizing at least one of lithium acrylate, lithium methacrylate, and dilithium maleate.

39. The method of claim 37, wherein the forming (c) comprises
soaking the anode active material layer in the solution or coating the anode active material layer with the solution.

40. The method of claim 37, wherein forming (a) comprises vapor-phase depositing the anode active material layer on the anode current collector.

41. The method of claim 37, further comprising:
(b) forming an oxide coat on the anode active material layer,
wherein the forming (b) is carried out before the forming (c) of the coat.

* * * * *